(12) United States Patent
Kimura et al.

(10) Patent No.: US 12,126,186 B2
(45) Date of Patent: Oct. 22, 2024

(54) WIRELESS POWER TRANSFER SYSTEM

(71) Applicant: TOYOTA JIDOSHA KABUSHIKI KAISHA, Aichi-ken (JP)

(72) Inventors: Norihito Kimura, Hekinan (JP);
Makoto Hashimoto, Seto (JP);
Tomokiyo Suzuki, Shizuoka-ken (JP);
Kazutaka Kimura, Mishima (JP);
Masaki Kanesaki, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 6 days.

(21) Appl. No.: 18/307,020

(22) Filed: Apr. 26, 2023

(65) Prior Publication Data
US 2023/0352978 A1 Nov. 2, 2023

(30) Foreign Application Priority Data
Apr. 28, 2022 (JP) ................... 2022-075158

(51) Int. Cl.
*H02J 50/12* (2016.01)
*H02J 50/70* (2016.01)

(52) U.S. Cl.
CPC .............. *H02J 50/12* (2016.02); *H02J 50/70* (2016.02)

(58) Field of Classification Search
CPC .................................. H02J 50/12; H02J 50/70
USPC ......................................................... 307/104
See application file for complete search history.

(56) References Cited

U.S. PATENT DOCUMENTS 10,134,524 B2 * 11/2018 Yuasa .................. H01F 27/363
2017/0169942 A1 6/2017 Yuasa

FOREIGN PATENT DOCUMENTS

JP 6332252 B2 5/2018

* cited by examiner

*Primary Examiner* — Hal Kaplan
(74) *Attorney, Agent, or Firm* — HAUPTMAN HAM, LLP

(57) ABSTRACT

A wireless power transfer system is configured in such a way that: a power transmitter coil and a power receiver coil each include a coil unit, the coil unit being a pair of coils arranged side by side in a horizontal direction, and a core unit, the core unit being a pair of cores each configured to induce a magnetic field generated by each of the coils; each core of the core unit is integrated with each coil and the cores are arranged spaced apart from each other; and each core of the core unit is provided with a core slot that divides the core at a position where the core slot configures the core to be substantially axisymmetric about a centerline that is at the same distance from each coil of the pair of coils as an axis of symmetry.

3 Claims, 19 Drawing Sheets

PLAN VIEW

SIDE VIEW

PERSPECTIVE VIEW

PLAN VIEW

SIDE VIEW

PERSPECTIVE VIEW

PLAN VIEW

CROSS-SECTIONAL VIEW

CROSS-SECTIONAL VIEW

PLAN VIEW

SIDE VIEW

PERSPECTIVE VIEW

PLAN VIEW

SIDE VIEW

PERSPECTIVE VIEW

FIG. 9A
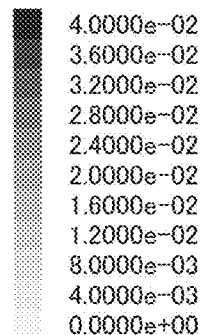
FIG. 9B
FIG. 9C
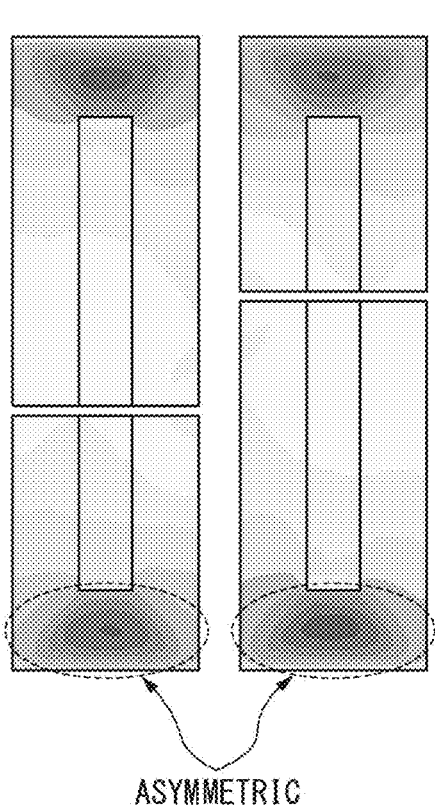
TARGET 1 FOR COMPARISON
ASYMMETRIC
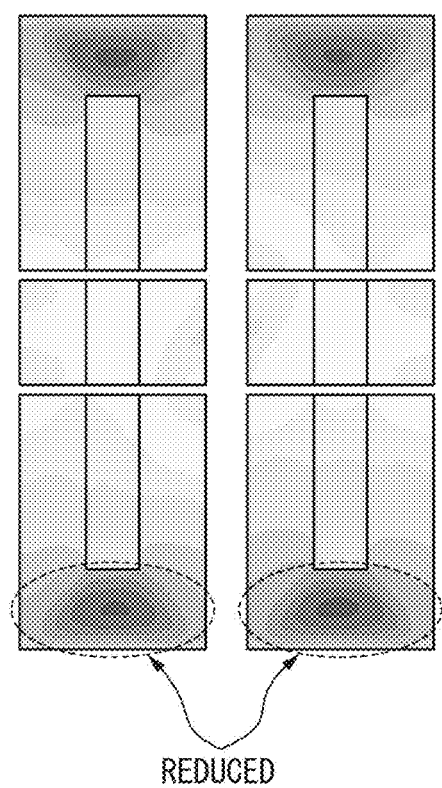
EMBODIMENT 1
REDUCED

PLAN VIEW

SIDE VIEW

PERSPECTIVE VIEW

PLAN VIEW

SIDE VIEW

PERSPECTIVE VIEW

FIG. 14A
FIG. 14B
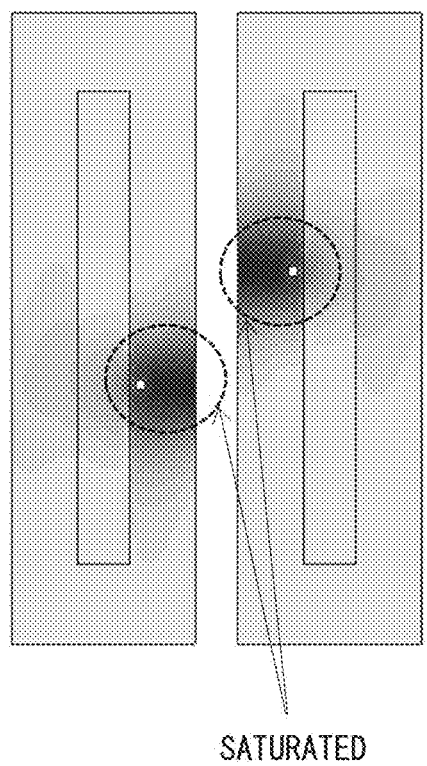
SATURATED
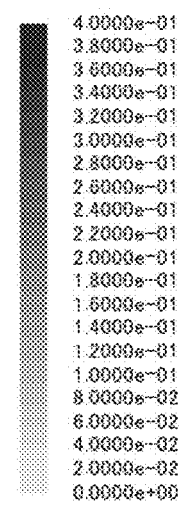
MAGNETIC FLUX DENSITY
(EFFECTIVE VALUE)
CONTOUR PLOT: T

PLAN VIEW

SIDE VIEW

PERSPECTIVE VIEW

PLAN VIEW

SIDE VIEW

PERSPECTIVE VIEW

FIG. 17A
FIG. 17B
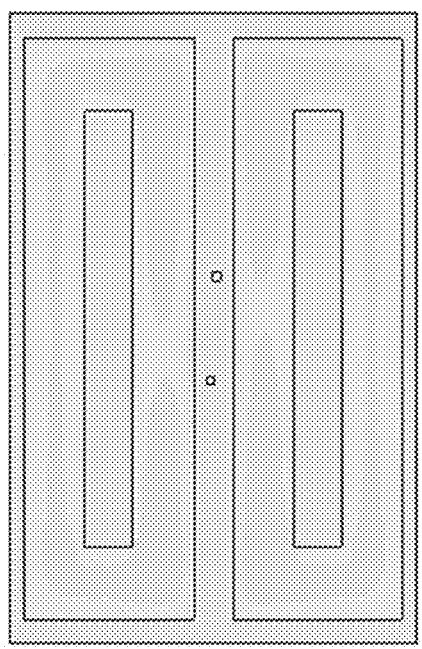
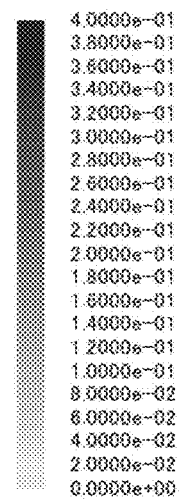
MAGNETIC FLUX DENSITY
(EFFECTIVE VALUE)
CONTOUR PLOT: T

WIRELESS POWER TRANSFER SYSTEM

RELATED APPLICATIONS

The present application claims priority of Japanese Patent Application No. 2022-075158 filed Apr. 28, 2022, the disclosure of which is hereby incorporated by reference herein in its entirety.

TECHNICAL FIELD

The present invention relates to a wireless power transfer system.

BACKGROUND

In a wireless power transfer system that wirelessly transfers power from a power transmitter coil to a power receiver coil, various techniques have been proposed for preventing deterioration of the coupling coefficient between the power transmitter coil and the power receiver coil.

For example, as disclosed in JP 6332252B, it has been publicly known that, in a power receiver device and a power transmitter device that include a plate-like ferrite having a first principal face and a second principal face that are arranged in a thickness direction and a coil disposed on the first principal face, the circumferential width of a notch in the coil is configured to be wider in the direction away from a hollow portion of the power receiver coil.

In the wireless power transfer system, when a leakage magnetic field not being interlinked with the power receiver coil among magnetic fields generated by the power transmitter coil spreads widely, in addition to causing deterioration of the coupling coefficient, the leakage magnetic field may influence the ambient environment. It is also a critical challenge to prevent increase in physical sizes of the power transmitter coil and the power receiver coil. Therefore, a wireless power transfer system has been desired in which increase in the physical sizes of the power transmitter coil and the power receiver coil is prevented and the leakage magnetic field can be successfully reduced at the same time.

SUMMARY

The gist of the present disclosure is as follows:

(1) A wireless power transfer system that wirelessly transfers power from a power transmitter coil to a power receiver coil,
  wherein the power transmitter coil and the power receiver coil each include a coil unit, the coil unit being a pair of coils arranged side by side in a horizontal direction, and a core unit, the core unit being a pair of cores each configured to induce a magnetic field generated by each of the coils in the coil unit,
  wherein each of the coils in the coil unit has a shape formed by being wound in a horizontal plane and the coils are configured in such a way that magnetic fields generated by currents are oriented oppositely to each other,
  wherein each of the cores in the core unit is integrated with each coil in the coil unit and the cores are arranged spaced apart from each other, and
  wherein each of the cores in the core unit is provided with a core slot that divides the core at a position where the core slot configures the core to be substantially axi-symmetric about a centerline that is at the same distance from each of the coils of the pair of coils as an axis of symmetry.

(2) The wireless power transfer system according to (1) described above, wherein a lead wire from the coil disposed on a first face of the core is routed to pass through the core slot to a second face, the second face being a face of the core opposite to the first face.

(3) A wireless power transfer system that wirelessly transfers power from a power transmitter coil to a power receiver coil,
  wherein the power transmitter coil and the power receiver coil each include: a coil unit, the coil unit being a pair of coils arranged side by side in a horizontal direction; a core unit, the core unit being a pair of cores each configured to induce a magnetic field generated by each of the coils in the coil unit; and a shield unit disposed on a face of the core unit that is opposite to the face on which the coil unit is provided,
  wherein each of the coils in the coil unit has a shape formed by being wound in a horizontal plane and those coils are configured in such a way that magnetic fields generated by currents are oriented oppositely to each other,
  wherein each of the cores in the core unit is integrated with each coil in the coil unit and the cores are arranged spaced apart from each other, and
  wherein a lead wire from the coil is routed to pass through a hole provided in a portion of the shield unit exposed between the pair of cores arranged spaced apart to a second face, the second face being a face of the shield unit opposite to a first face on which the core is provided.

BRIEF DESCRIPTION OF DRAWINGS

FIG. 9A is a diagram illustrating legend of magnetic flux density in X direction for FIGS. 9B and 9C.

FIG. 9B is a diagram illustrating distributions of magnetic flux densities in the X direction (the direction of travel of a vehicle) inside a core of the power transmitter coil C111 of target 1 for comparison when power of 30 kW is transmitted.

FIG. 9C is a diagram illustrating distributions of magnetic flux densities in the X direction (the direction of travel of a vehicle) inside a core of a power transmitter coil 111 according to embodiment 1 of the present disclosure when power of 30 kW is transmitted.

FIG. 14A is a diagram illustrating the distribution of a magnetic flux density inside a core of the power transmitter coil C311 of target 2 for comparison when power of 30 kW is transmitted.

FIG. 14B is a diagram illustrating legend of magnetic flux density for FIG. 14A.

FIG. 17A is a diagram illustrating the distribution of a magnetic flux density inside a core of the power transmitter coil 111 according to embodiment 2 of the present disclosure when power of 30 kW is transmitted.

FIG. 17B is a diagram illustrating legend of magnetic flux density for FIG. 17A.

DETAILED DESCRIPTION

With reference to the drawings, a wireless power transfer system will be described below. In embodiments to be described below, when the numbers, quantities, amounts, or ranges of respective elements are mentioned, the present invention is not limited to such mentioned numbers, quantities, amounts, or ranges unless they are expressly specified or obviously identified according to a principle. In addition, configurations described in the embodiments to be described below are not indispensable to the present invention unless they are expressly specified or obviously identified according to a principle. In each drawing, like members are denoted by like reference signs. To facilitate understanding, these drawings use different scales as appropriate. The illustrated embodiments are examples for implementing the present disclosure, and the present disclosure is not limited to these embodiments.

1. Configuration 1-1. Circuit Configuration

Figure 1:
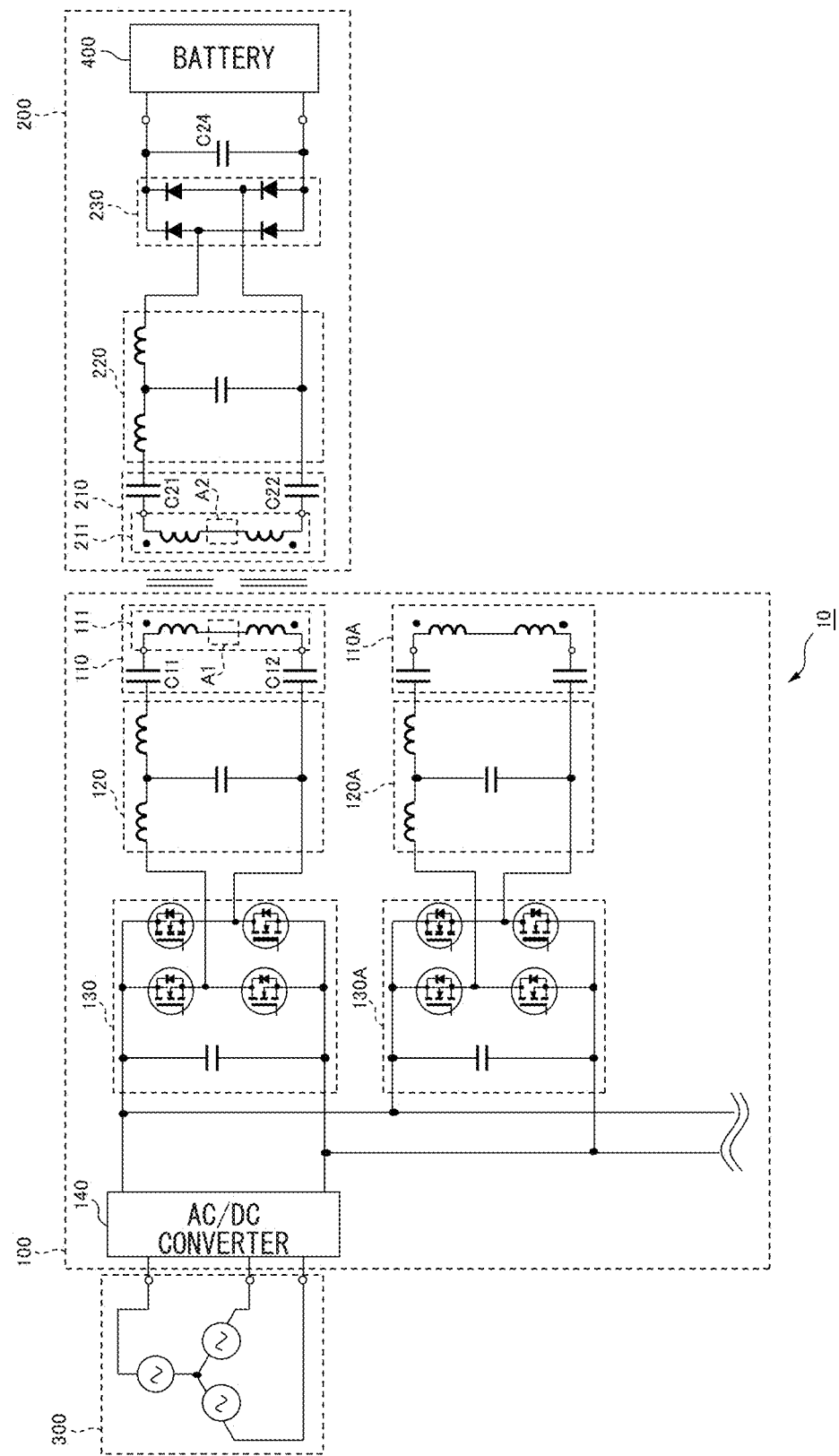
FIG. 1 is a circuit diagram illustrating a circuit configuration of a wireless power transfer system 10 according to embodiments 1 and 2 of the present disclosure.

FIG. 1 is a circuit diagram illustrating a circuit configuration of a wireless power transfer system 10 according to embodiments 1 and 2 of the present disclosure. The wireless power transfer system 10 according to embodiments 1 and 2 of the present disclosure includes a power transmitter device 100, a power receiver device 200, a power supply 300, and a battery 400.

The power transmitter device 100 and the power supply 300 are typically fixedly mounted on the ground, on a road surface, or on a floor. The power receiver device 200 and the battery 400 are typically installed in a movable object (a vehicle, a smartphone, or the like), which is a subject for charging.

The wireless power transfer system 10 according to embodiments 1 and 2 of the present disclosure transfers power, as magnetic resonance occurs between a power transmitter coil 111 included in the power transmitter device 100 and a power receiver coil 211 included in the power receiver device 200, from the power transmitter coil 111 to the power receiver coil 211. In other words, power is transferred by means of the magnetic resonance method. Power supplied by the power supply 300 to the power transmitter device 100 is thus transferred to the power receiver device 200, and the power receiver device 200 charges the battery 400.

Note that, although FIG. 1 illustrates a single power receiver device 200 and a single battery 400, when there are a plurality of movable objects, which are subjects for charging, the power receiver device 200 and the battery 400 illustrated in FIG. 1 are installed on each movable object. The plurality of movable objects may receive power from the same power transmitter device 100 and charge the battery 400 thereof.

The power supply 300 is connected with the power transmitter device 100 and supplies power to the power transmitter device 100. The power supply 300 is a three-phase AC power supply. For example, the power supply 300 is a system power supply with 200V phase voltage. Note that the power supply 300 may be a single-phase AC power supply.

The battery 400 is connected with the power receiver device 200, and charged by the power receiver device 200. The battery 400 is typically a rechargeable DC power supply such as a lithium-ion battery or a nickel hydride battery.

The power transmitter device 100 includes a power transmitter circuit 110, an immittance filter 120, an inverter 130, and an AC/DC converter 140. Each of the power transmitter circuit 110, the immittance filter 120, the inverter 130, and the AC/DC converter 140 are configured to be connected by means of a cascade connection.

The AC/DC converter 140 rectifies and transforms AC power supplied by the power supply 300, and outputs the resultant DC power to the inverter 130. The AC/DC converter 140 is typically constructed from a rectifier circuit including diodes and capacitors and a buck-boost circuit including a semiconductor switching device (such as an IGBT or a MOSFET). With the semiconductor switching device controlled by a controller (not illustrated), the AC/DC converter 140 is controlled with respect to the output voltage thereof and activating/deactivating. The controller includes one or more CPUs (Central Processing Units) and a peripheral circuit thereof. The controller may further include an arithmetic circuit such as a logical operation unit or an arithmetic logical unit. The controller performs various processes in accordance with a software program.

The inverter 130 converts a DC power output from the AC/DC converter 140 into an AC power of a predetermined frequency and outputs the resultant AC power via the immittance filter 120 to the power transmitter circuit 110. The inverter 130 performs conversion of DC power in such a way that the frequency of the output AC power is equal to the resonance frequency of the power transmitter circuit 110 to be described later. The frequency of the AC power output by the inverter 130 (i.e., the resonance frequency of the power transmitter circuit 110) is, for example, a high frequency as high as 85 kHz.

The inverter 130 is typically constructed from a single-phase full-bridge circuit including a semiconductor switching device. As switching control is performed on the inverter 130 by a controller (not illustrated) by means of the pulse width modulation (PWM) method, the inverter 130 converts a DC power into an AC power of a predetermined frequency. The inverter 130 is also controlled by the controller with respect to activating/deactivating.

The immittance filter 120 reduces an electromagnetic noise in the output power from the inverter 130. The immittance filter 120 is constructed from a coil and a capacitor as illustrated in FIG. 1 and functions as a low-pass filter to regulate impedance of the power transmitter device 100.

The power transmitter circuit 110 is a resonant circuit constructed from the power transmitter coil 111 and capacitors C11 and C12. Coils L11 and L12 in the power transmitter coil 111 are respectively connected with the capacitors C11 and C12 at one end thereof. The capacitor C11, the coil L11, the coil L12, and the capacitor C12 are connected in series in this order, and the power transmitter circuit 110 is a series resonant circuit. The capacitors C11 and C12 are resonant capacitors that provide capacitance to the resonant circuit (power transmitter circuit 110). The capacitances of the capacitors C11 and C12 are approximately equal. Details of the power transmitter circuit 110 and the power transmitter coil 111 will be described later.

The resonance frequency of the power transmitter circuit 110 is equal to the frequency of the output power from the inverter 130. The power transmitter coil 111 magnetically resonates with the power receiver coil 211 to be described later due to the power output from the inverter 130 at the resonance frequency. As a result, power is transmitted from the power transmitter coil 111 to the power receiver coil 211.

When power is transferred to a moving movable object, a plurality of power transmitter coils 111 (consequently, the power transmitter circuit 110) are arranged along a route traveled by the movable object. For example, when power is transferred to a traveling vehicle, a plurality of power transmitter coils 111 are arranged on a road along a route traveled by the vehicle. In this case, it is desired to properly switch power transmitter coils 111 for transmitting power according to the travel of the movable object. Therefore, in addition to the power transmitter circuit 110, a plurality of immittance filters 120 and a plurality of inverters 130 are arranged along the route of travel. In contrast, more than one AC/DC converter 140 is not necessary to be arranged as long as DC power output from the AC/DC converter 140 is supplied to each of the inverters 130.

To indicate this, FIG. 1 illustrates a case where the power transmitter device 100 includes a plurality of power transmitter circuits 110, a plurality of immittance filters 120, and a plurality of inverters 130. As illustrated in FIG. 1, a plurality of circuits in which the power transmitter circuits 110, the immittance filters 120, and the inverters 130 are connected by means of a cascade connection are connected with the AC/DC converter 140 in parallel at the output ends of the AC/DC converter 140. The power transmitter circuits 110, the immittance filters 120, and the inverters 130 here are equivalent to those described above. To distinguish each one of the power transmitter circuits 110, the immittance filters 120, and the inverters 130, a symbol (A, B, or the like) is attached to each reference sign. Note that the power transmitter device 100 according to embodiments 1 and 2 of the present disclosure may be constructed from a single power transmitter circuit 110, a single immittance filter 120, and a single inverter 130.

The power receiver device 200 includes a power receiver circuit 210, an immittance filter 220, a rectifier circuit 230, and a smoothing capacitor C24. Each of the power receiver circuit 210, the immittance filter 220, and the rectifier circuit 230 is configured to be connected by means of a cascade connection. The smoothing capacitor C24 is connected to output ends of the rectifier circuit.

The power receiver circuit 210 is a resonant circuit constructed from the power receiver coil 211 and capacitors C21 and C22. Coils L21 and L22 in the power receiver coil 211 are respectively connected with the capacitors C21 and C22 at one end thereof. The capacitor C21, the coil L21, the coil L22, and the capacitor C22 are connected in series in this order, and the power receiver circuit 210 is a series resonant circuit. The capacitors C21 and C22 are resonant capacitors that provide capacitance to the resonant circuit (power receiver circuit 210). The capacitances of the capacitors C21 and C22 are approximately equal. Details of the power receiver circuit 210 and the power receiver coil 211 will be described later.

The resonance frequency of the power receiver circuit 210 is equal to the frequency (the resonance frequency of the power transmitter circuit 110) of the output power from the inverter 130. The power receiver coil 211 magnetically resonates with the power transmitter coil 111 and receives power transmitted from the power transmitter coil 111.

The immittance filter 220 reduces an electromagnetic noise in the power received by the power receiver circuit 210. The immittance filter 220 is constructed from a coil and a capacitor as illustrated in FIG. 1 and functions as a low-pass filter to regulate impedance of the power receiver device 200.

The rectifier circuit 230 converts power received by the power receiver circuit 210 into DC power and outputs the resultant DC power. The rectifier circuit 230 is typically a single-phase full-wave rectifier circuit.

The smoothing capacitor C24 smooths the DC power output by the rectifier circuit 230. The DC power smoothed by the smoothing capacitor C24 will be the charging power of the battery 400.

1-2. Power Transmitter Circuit and Power Receiver Circuit According to Embodiment 1

1-2-1. Power Transmitter Circuit According to Embodiment 1

Figure 2A:
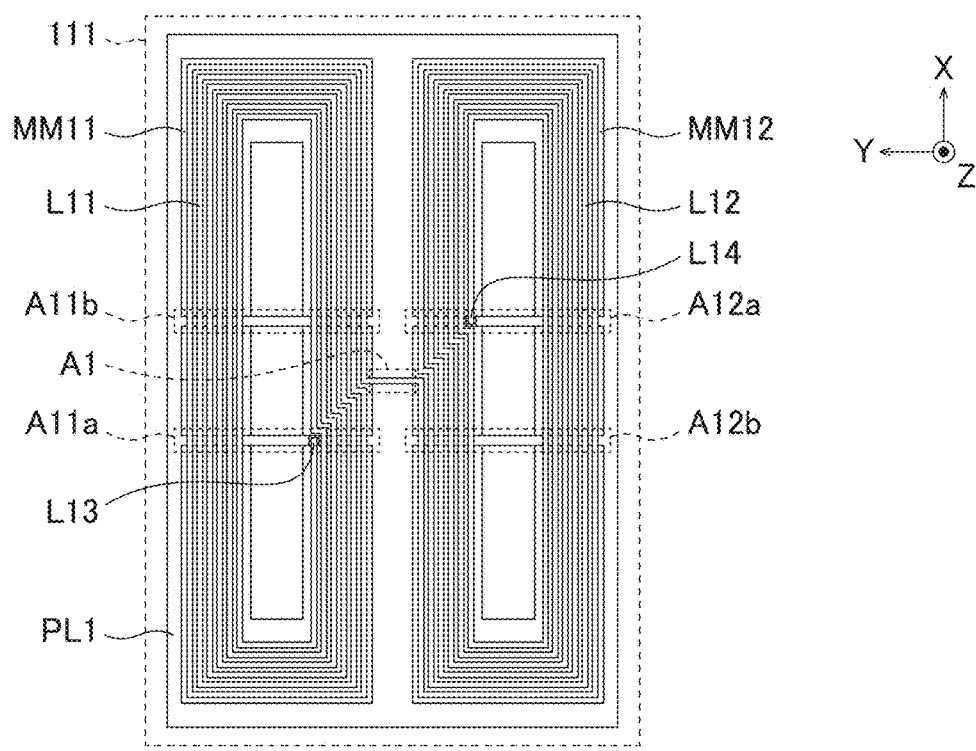
FIG. 2A is a plan view viewed from a vertical direction (Z-axis direction) for explaining a configuration of a power transmitter circuit 110 according to embodiment 1 of the present disclosure.
Figure 2B:
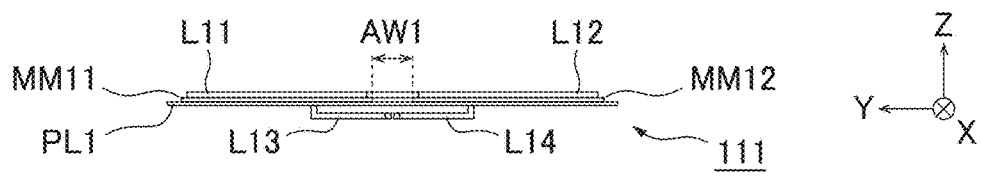
FIG. 2B is a side view viewed from a longitudinal direction (X-axis direction) on the horizontal plane for explaining a configuration of a power transmitter circuit 110 according to embodiment 1 of the present disclosure.
Figure 2C:
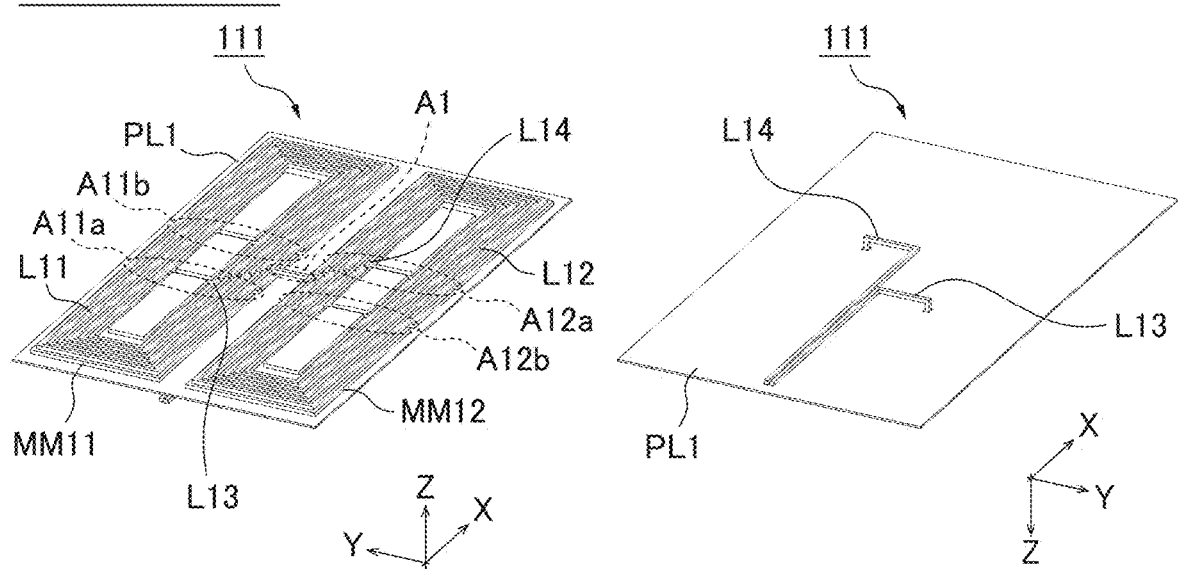
FIG. 2C is a perspective view for explaining a configuration of a power transmitter circuit 110 according to embodiment 1 of the present disclosure.

FIGS. 2A, 2B and 2C are conceptual diagrams for explaining a configuration of the power transmitter circuit 110 according to embodiment 1 of the present disclosure. With respect to the power transmitter circuit 110 positioned on a horizontal plane (X-Y plane), FIG. 2A is a plan view viewed from a vertical direction (Z-axis direction), FIG. 2B is a side view viewed from a longitudinal direction (X-axis direction) on the horizontal plane, and FIG. 2C is a perspective view. The power transmitter circuit 110 is a resonant circuit constructed from the power transmitter coil 111 and the capacitors C11 and C12 as described above.

The power transmitter coil 111 includes a first coil unit being a pair of coils (coils L11 and L12), a first core unit being a pair of cores (cores MM11 and MM12), and an aluminum plate PL1. The coils L11 and L12 and the cores MM11 and MM12 are held by a plastic component or the like (not illustrated).

Each of the coils L11 and L12 in the first coil unit has, as illustrated in FIGS. 2A, 2B and 2C, a circular shape formed by being wound in the horizontal plane (X-Y plane). The coils L11 and L12 are connected to each other at one end thereof by a connecting portion A1, and they are wound in such a way that the magnetic fields generated by currents are oriented oppositely to each other. In other words, the coil L11 generates, for example, an upward magnetic field with respect to the vertical direction (Z-axis direction) while the coil L12 generates, for example, a downward magnetic field with respect to the vertical direction (Z-axis direction).

The cores MM11 and MM12 in the first core unit are made of a magnetic material and respectively induce magnetic fields generated by the coils L11 and L12 in the first coil unit. The cores MM11 and MM12 are typically composed of ferrite.

The cores MM11 and MM12 in the first core unit are respectively integrated with the coils L11 and L12 in the first coil unit, and the cores are arranged side by side with a distance AW1 (referred to as a "first inter-core distance AW1") apart in the horizontal direction (Y-axis direction).

Each of the cores MM11 and MM12 in the first core unit is provided with a core slot that divides the core substantially along the Y-axis direction at a position where the core slot configures the core to be substantially axisymmetric about a centerline (the centerline located midway between the coils L11 and L12 of the pair of coils) that is at the same distance from each of the coils L11 and L12 of the pair of coils as an axis of symmetry. In the illustrated example, the core MM11 is provided with a core slot A11a and a core slot A11b, both of which divide the core MM11 substantially along the Y-axis direction. In other words, the core slot A11a and the core slot A11b divide the core MM11 into three portions. The core MM12 is provided with a core slot A12a and a core slot A12b, both of which divide the core MM12 substantially along the Y-axis direction. The core slot A12a and the core slot A12b divide the core MM12 into three portions. The core slot A11a provided in the core MM11 and the core slot A12b provided in the core MM12 are in a positional relationship in which these core slots are positioned substantially axisymmetric about the centerline that is at the same distance from each of the coils L11 and L12 of the pair of coils as an axis of symmetry. The core slot A11b provided in the core MM11 and the core slot A12a provided in the core MM12 are in a positional relationship in which these core slots are positioned substantially axisymmetric about the centerline that is at the same distance from each of the coils L11 and L12 of the pair of coils as an axis of symmetry.

Each of the coils L11 and L12 in the first coil unit has two longer sides (in FIGS. 2A, 2B and 2C, the sides of the coil along the X-axis direction, which is a major axis direction) and two shorter sides (in FIGS. 2A, 2B and 2C, the sides of the coil along the Y-axis direction, which is a minor axis direction). The coils L11 and L12 in the first coil unit are connected to each other by the connecting portion A1 at points in outside diameter portions of the opposing longer sides of the coils L11 and L12. In other words, the connecting portion A1 is provided on outside diameter sides of the adjacent longer sides of the pair of coils L11 and L12, the longer sides being opposed to each other (in an area between the coils L11 and L12).

To prevent increase in the physical size of the power transmitter coil 111, lead wires L13 and L14 of the coils L11 and L12 in the first coil unit are respectively routed to a backside of the first core unit and the aluminum plate PL1 via the core slots A11a and A12a. However, just providing the core slots A11a and A12a in the first core unit causes imbalance in magnetoresistance of the coils L11 and L12, and the magnetic field generated by the lead wires cause saturation in the first core unit. To prevent this saturation, the first core unit is purposely configured in such a way that the core slots A11b and A12b through which the lead wires of the coils do not pass are respectively provided at positions on the cores MM11 and MM12 where the core slots A11b and A12b and the core slots A11a and A12a through which the lead wires of the coils pass are substantially axisymmetric. Further details will be described below.

The lead wire L13 for connecting a coil end opposite to the coil end of the coil L11 that runs to the connecting portion A1 with the capacitor C11 in FIG. 1 is routed from inside diameter sides (the innermost portion of the loop of the coil L11) of the adjacent longer sides of the pair of coils L11 and L12, the longer sides being opposed to each other. The lead wire L13 is routed through the core slot A11a from a first face of the core MM11 on which the coil L11 is provided to a second face that is the face of the core MM11 opposite to the first face, and further routed to pass through a hole provided in the aluminum plate PL1 to the backside (the face opposite to the face that is in contact with the core MM11) of the aluminum plate PL1. The lead wire L13 routed from the backside of the aluminum plate PL1 is connected with the capacitor C11 in FIG. 1.

The lead wire L14 for connecting a coil end opposite to the coil end of the coil L12 that runs to the connecting portion A1 with the capacitor C12 in FIG. 1 is routed from inside diameter sides (the innermost portion of the loop of the coil L12) of the adjacent longer sides of the pair of coils L11 and L12, the longer sides being opposed to each other. The lead wire L14 is routed through the core slot A12a from a first face of the core MM12 on which the coil L12 is provided to a second face that is the face of the core MM12 opposite to the first face, and further routed to pass through a hole provided in the aluminum plate PL1 to the backside (the face opposite to the face that is in contact with the core MM12) of the aluminum plate PL1. The lead wire L14 routed from the backside of the aluminum plate PL1 is connected with the capacitor C12 in FIG. 1.

It is preferred that the position at which the lead wire L13 passes in the core slot A11a and the position at which the lead wire L14 passes in the core slot A12a are in a positional relationship in which these positions are substantially point-symmetric about a substantially central point of the connecting portion A1 as a point of symmetry.

The shorter sides of the coils L11 and L12 in the first coil unit generates magnetic fields in the X direction. Therefore, if only coil slots A11a and A12a are provided in the cores MM11 and MM12 for the lead wires of the coils to pass through, since the core slot A11a of the core MM11 and the core slot A12a of the core MM12 are not in an axisymmetric positional relationship, imbalance is caused in magnetoresistance, and as a result, the magnetic fields in the X direction generated by the coils L11 and L12 are imbalanced, which will increase intensity of distant leakage magnetic fields in the X direction. In embodiment 1 of the present disclosure, to keep the magnetoresistances in the X direction of the coils L11 and L12 balanced, the first core unit is purposely configured in such a way that the core slots A11b and A12b through which the lead wires of the coils do not pass are respectively provided at positions on the cores MM11 and MM12 where the core slots A11b and A12b and the core slots A11a and A12a through which the lead wires of the coils pass are substantially axisymmetric. In this way, the imbalance in magnetoresistance in the X direction is eliminated, and increase in intensity of the distant leakage magnetic field in the X direction caused by the division of the core can be successfully reduced.

The aluminum plate PL1 is a shield unit that is disposed under the coils L11 and L12 and the cores MM11 and MM12, and that reduces an effect of an external magnetic field on the power transmitter circuit 110. In other words, the aluminum plate PL1 is disposed on a face of the two faces of the first core unit that is opposite to the face on which the first coil unit is provided. Therefore, the first coil unit, the first core unit, and the aluminum plate PL1 are arranged in this order to be overlapped with each other.

1-2-2 Power Receiver Circuit According to Embodiment 1

Figure 3A:
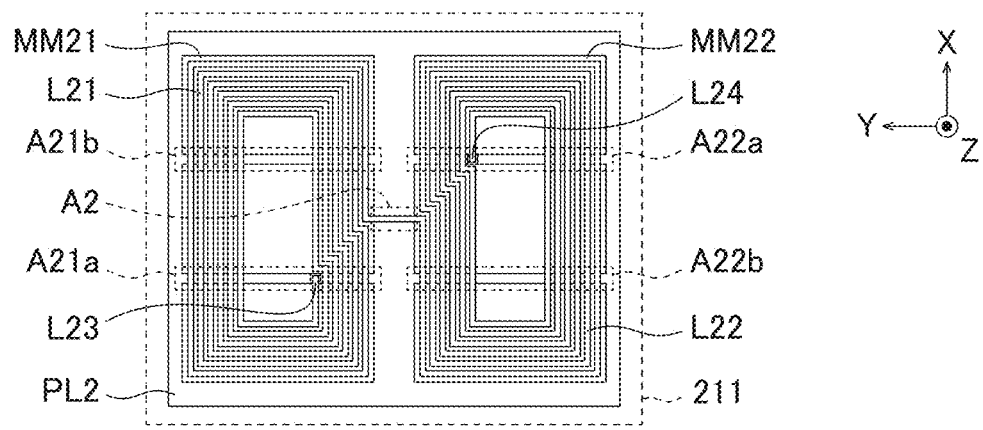
FIG. 3A is a plan view viewed from a vertical direction (Z-axis direction) for explaining a configuration of a power receiver circuit 210 according to embodiment 1 of the present disclosure.
Figure 3B:
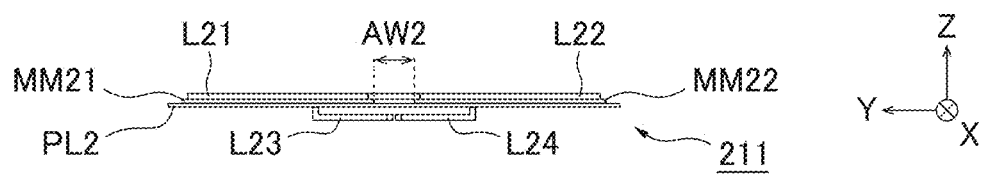
FIG. 3B is a side view viewed from a longitudinal direction (X-axis direction) on the horizontal plane for explaining a configuration of a power receiver circuit 210 according to embodiment 1 of the present disclosure.
Figure 3C:
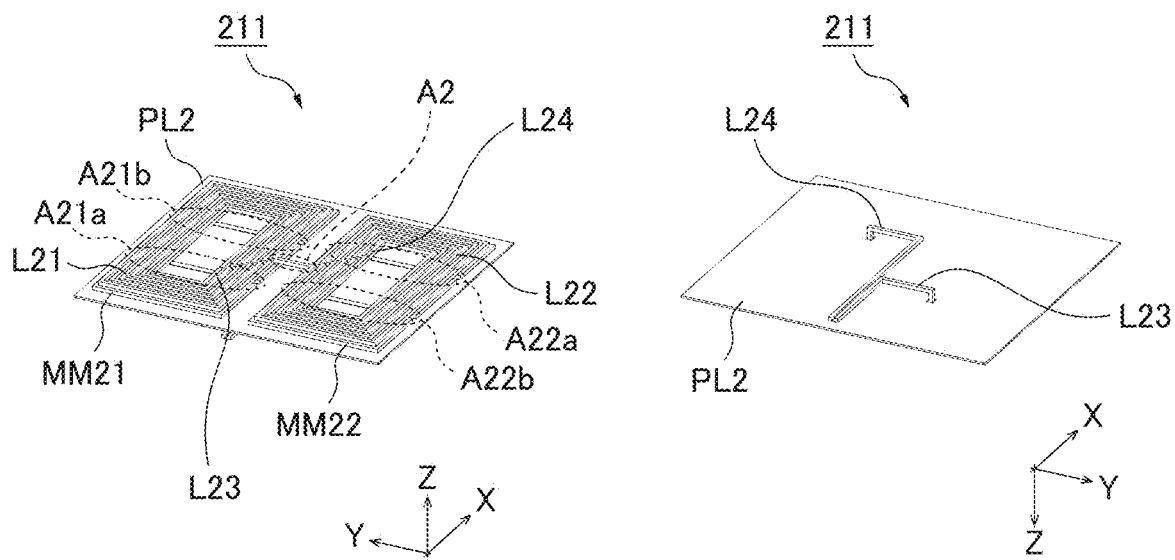
FIG. 3C is a perspective view for explaining a configuration of a power receiver circuit 210 according to embodiment 1 of the present disclosure.

FIGS. 3A, 3B and 3C are conceptual diagrams for explaining a configuration of the power receiver circuit 210 according to embodiment 1 of the present disclosure. With respect to the power receiver circuit 210 positioned on a horizontal plane (X-Y plane), FIG. 3A is a plan view viewed from a vertical direction (Z-axis direction), FIG. 3B is a side view viewed from a longitudinal direction (X-axis direction) on the horizontal plane, and FIG. 3C is a perspective view. The power receiver circuit 210 is a resonant circuit constructed from the power receiver coil 211 and the capacitors C21 and C22 as described earlier.

The power receiver coil 211 includes a second coil unit being a pair of coils (coils L21 and L22), a second core unit being a pair of cores (cores MM21 and MM22), and an aluminum plate PL2. The coils L21 and L22 and the cores MM21 and MM22 are held by a plastic component or the like (not illustrated).

Each of the coils L21 and L22 in the second coil unit has, as illustrated in FIGS. 3A, 3B and 3C, a circular shape formed by being wound in the horizontal plane (X-Y plane). The coils L21 and L22 are connected to each other at one end thereof by a connecting portion A2, and they are wound in such a way that the magnetic fields generated by currents are oriented oppositely to each other. In this way, the coils L21 and L22 in the second coil can respectively properly receive magnetic fields generated by the coils L11 and L12 in the first coil unit, which are oriented oppositely to each other.

The cores MM21 and MM22 in the second core unit are made of a magnetic material and respectively induce magnetic fields generated by the coils L21 and L22 in the second coil unit. The cores MM21 and MM22 are typically composed of ferrite.

The cores MM21 and MM22 in the second core unit are respectively integrated with the coils L21 and L22 in the second coil unit, and the cores are arranged side by side with a distance AW2 (referred to as a "second inter-core distance AW2") apart in the horizontal direction (Y-axis direction).

Each of the cores MM21 and MM22 in the second core unit is provided with a core slot that divides the core substantially along the Y-axis direction at a position where the core slot configures the core to be substantially axisymmetric about a centerline (the centerline located midway between the coils L21 and L22 of the pair of coils) that is at the same distance from each of the coils L21 and L22 of the pair of coils as an axis of symmetry. In the illustrated example, the core MM21 is provided with a core slot A21*a* and a core slot A21*b*, both of which divide the core MM21 substantially along the Y-axis direction. In other words, the core slot A21*a* and the core slot A21*b* divide the core MM21 into three portions. The core MM22 is provided with a core slot A22*a* and a core slot A22*b*, both of which divide the core MM22 substantially along the Y-axis direction. The core slot A22*a* and the core slot A22*b* divide the core MM22 into three portions. The core slot A21*a* provided in the core MM21 and the core slot A22*b* provided in the core MM22 are in a positional relationship in which these core slots are positioned substantially axisymmetric about the centerline that is at the same distance from each of the coils L21 and L22 of the pair of coils as an axis of symmetry. The core slot A21*b* provided in the core MM21 and the core slot A22*a* provided in the core MM22 are in a positional relationship in which these core slots are positioned substantially axisymmetric about the centerline that is at the same distance from each of the coils L21 and L22 of the pair of coils as an axis of symmetry.

Each of the coils L21 and L22 in the second coil unit has two longer sides (in FIGS. 3A, 3B and 3C, the sides of the coil along the X-axis direction, which is a major axis direction) and two shorter sides (in FIGS. 3A, 3B and 3C, the sides of the coil along the Y-axis direction, which is a minor axis direction). The coils L21 and L22 in the second coil unit are connected to each other by the connecting portion A2 at points in outside diameter portions of the opposing longer sides of the coils L21 and L22. In other words, the connecting portion A2 is provided on outside diameter sides of the adjacent longer sides of the pair of coils L21 and L22, the longer sides being opposed to each other (in an area between the coils L21 and L22).

To prevent increase in the physical size of the power receiver coil 211, lead wires L23 and L24 of the coils L21 and L22 in the second coil unit are respectively routed to a backside of the second core unit and the aluminum plate PL2 via the core slots A21*a* and A22*a*. However, just providing the core slots A21*a* and A22*a* in the second core unit causes imbalance in magnetoresistance of the coils L21 and L22, and the magnetic field generated by the lead wires cause saturation in the second core unit. To prevent this saturation, the second core unit is purposely configured in such a way that the core slots A21*b* and A22*b* through which the lead wires of the coils do not pass are respectively provided at positions on the cores MM21 and MM22 where the core slots A11*b* and A12*b* and the core slots A21*a* and A22*a* through which the lead wires of the coils pass are substantially axisymmetric. Further details will be described below.

The lead wire L23 for connecting a coil end opposite to the coil end of the coil L21 that runs to the connecting portion A2 with the capacitor C21 in FIG. 1 is routed from inside diameter sides (the innermost portion of the loop of the coil L21) of the adjacent longer sides of the pair of coils L21 and L22, the longer sides being opposed to each other. The lead wire L23 is routed through the core slot A21*a* from a first face of the core MM21 on which the coil L21 is provided to a second face that is the face of the core MM21 opposite to the first face, and further routed to pass through a hole provided in the aluminum plate PL2 to the backside (the face opposite to the face that is in contact with the core MM21) of the aluminum plate PL2. The lead wire L23 routed from the backside of the aluminum plate PL2 is connected with the capacitor C21 in FIG. 1.

The lead wire L24 for connecting a coil end opposite to the coil end of the coil L22 that runs to the connecting portion A2 with the capacitor C22 in FIG. 1 is routed from inside diameter sides (the innermost portion of the loop of the coil L22) of the adjacent longer sides of the pair of coils L21 and L22, the longer sides being opposed to each other. The lead wire L24 is routed through the core slot A22*a* from a first face of the core MM22 on which the coil L22 is provided to a second face that is the face of the core MM22 opposite to the first face, and further routed to pass through a hole provided in the aluminum plate PL2 to the backside (the face opposite to the face that is in contact with the core MM22) of the aluminum plate PL2. The lead wire L24 routed from the backside of the aluminum plate PL2 is connected with the capacitor C22 in FIG. 1.

It is preferred that the position at which the lead wire L23 passes in the core slot A21*a* and the position at which the lead wire L24 passes in the core slot A22*a* are in a positional relationship in which these positions are substantially point-symmetric about a substantially central point of the connecting portion A2 as a point of symmetry.

The shorter sides of the coils L21 and L22 in the second coil unit generates magnetic fields in the X direction. Therefore, if only core slots A21*a* and A22*a* are provided in the cores MM21 and MM22 for the lead wires of the coils to pass through, since the core slot A21*a* of the core MM21 and the core slot A22*a* of the core MM22 are not in an axisymmetric positional relationship, imbalance is caused in magnetoresistance, and as a result, the magnetic fields in the X direction generated by the coils L21 and L22 are imbalanced, which will increase intensity of distant leakage magnetic fields in the X direction. In embodiment 1 of the present disclosure, to keep the magnetoresistances in the X direction of the coils L21 and L22 balanced, the first core unit is purposely configured in such a way that the core slots A21*b* and A22*b* through which the lead wires of the coils do not pass are respectively provided at positions on the cores MM21 and MM22 where the core slots A11*b* and A12*b* and the core slots A21*a* and A22*a* through which the lead wires of the coils pass are substantially axisymmetric. In this way, the imbalance in magnetoresistance in the X direction is eliminated, and increase in intensity of the distant leakage magnetic field in the X direction caused by the division of the core can be successfully reduced.

The first coil unit (coils L11 and L12) of the power transmitter coil 111 and the second coil unit (coils L21 and L22) of the power receiver coil 211 are located to face each other. Therefore, as illustrated in FIGS. 2A, 2B and 2C and FIGS. 3A, 3B and 3C, when the first coil unit (coils L11 and L12) and the second coil unit (coils L21 and L22) of the power receiver coil 211 are located to face each other, the coil winding of the power receiver coil 211 from the coil L21 to the coil L22 via the connecting portion A2 is configured to be similarly routed to that of the power transmitter coil 111 from the coil L11 to the coil L12 via the connecting portion A1. Similarly, as illustrated in FIGS. 2A, 2B and 2C and FIGS. 3A, 3B and 3C, when the first coil unit (coils L11 and L12) and the second coil unit (coils L21 and L22) of the power receiver coil 211 are located to face each other, lead wires of the power receiver coil 211 that run from the second coil unit (coils L21 and L22) to the capacitor C21 and the capacitor C22 are configured to be similarly routed to those of the power transmitter coil 111 that run from the first coil unit (coils L11 and L12) to the capacitor C11 and the capacitor C12. In this way, increase in intensity of the distant leakage magnetic field in the X direction and intensity of the distant leakage magnetic field in the Y direction can be successfully reduced even further.

In addition, the length of the first coil unit in the major axis direction (in FIGS. 2A, 2B and 2C, the X-axis direction) is configured to be longer than the length of the second coil unit in the major axis direction (in FIGS. 3A, 3B and 3C, the X-axis direction). In contrast, the lengths of the first coil unit and the second coil unit in the minor axis direction (in FIGS. 2A, 2B and 2C and FIGS. 3A, 3B and 3C, the Y-axis direction) are configured to be equal. In this way, pulsation of the power received by the power receiver coil 211 can be reduced.

The aluminum plate PL2 is a shield unit that is disposed under the coils L21 and L22 and the cores MM21 and MM22, and that reduces an effect of an external magnetic field on the power receiver circuit 210. In other words, the aluminum plate PL2 is disposed on a face of the two faces of the second core unit that is opposite to the face on which the second coil unit is provided. In other words, the second coil unit, the second core unit, and the aluminum plate PL2 are arranged in this order to be overlapped with each other.

1-2-3 Arrangement

Figure 4:
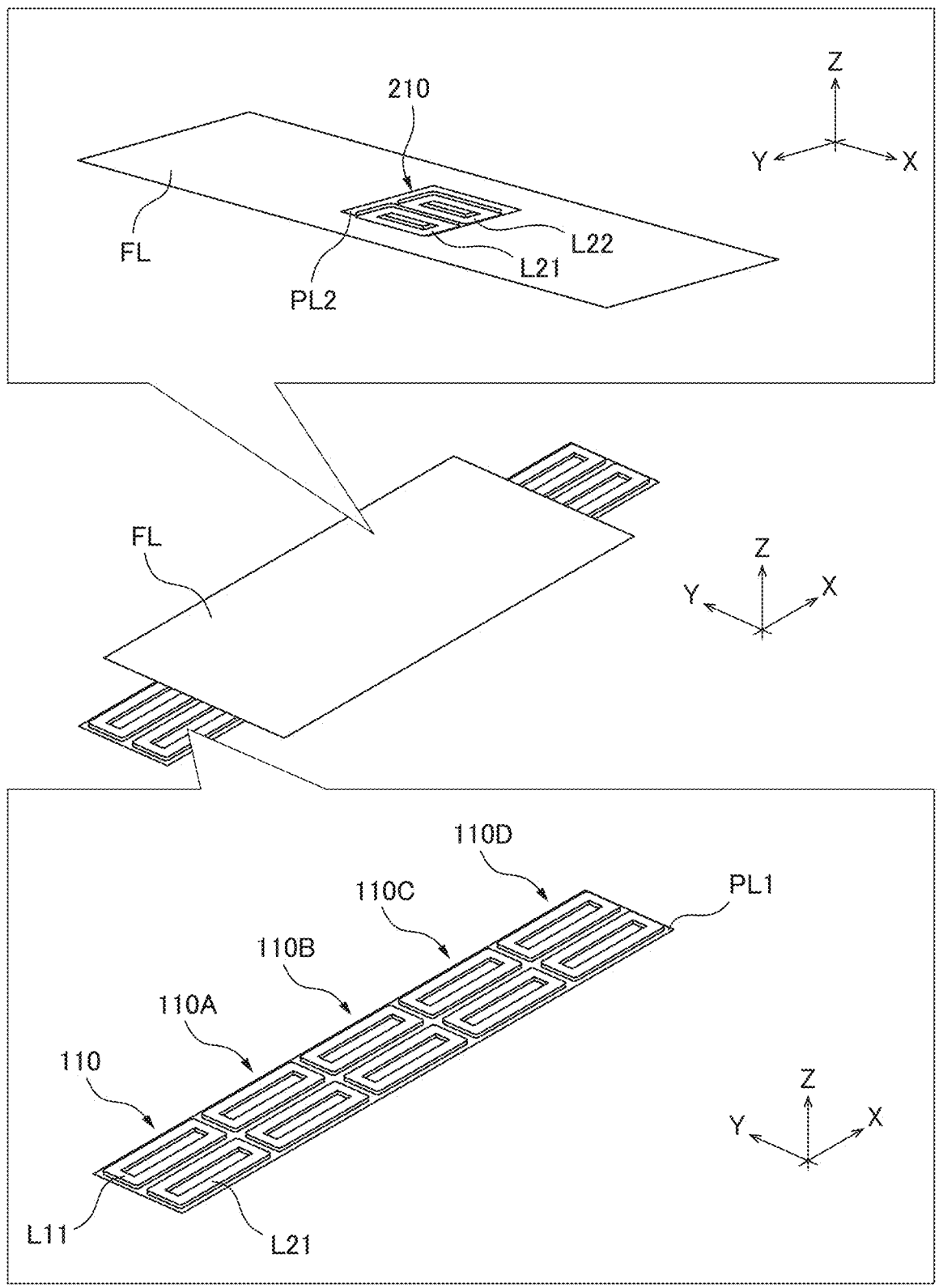
FIG. 4 is a conceptual diagram for explaining arrangement of the power transmitter circuit 110 and the power receiver circuit 210.
Figure 5A:
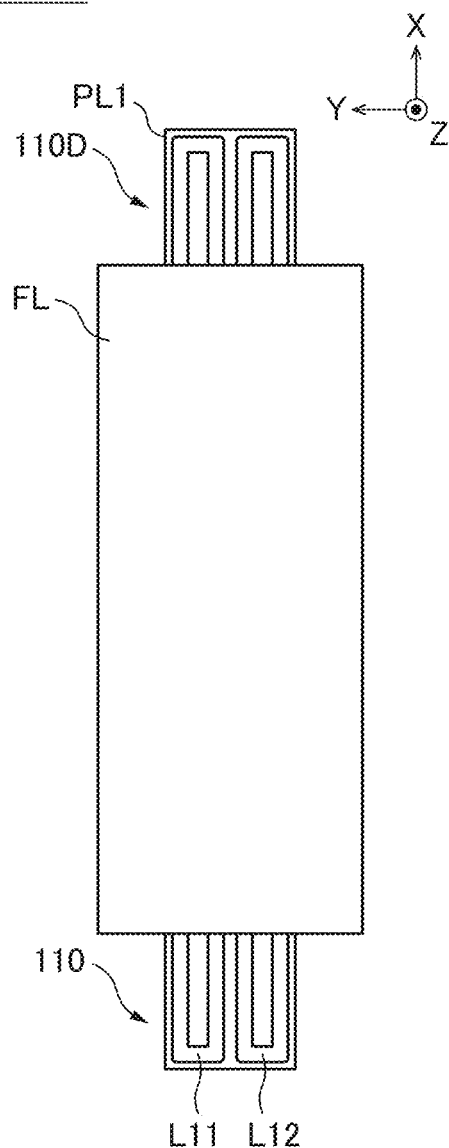
FIG. 5A is a plan view viewed from a vertical direction (Z-axis direction) for explaining arrangement of the power transmitter circuit 110 and the power receiver circuit 210.
Figure 5B:
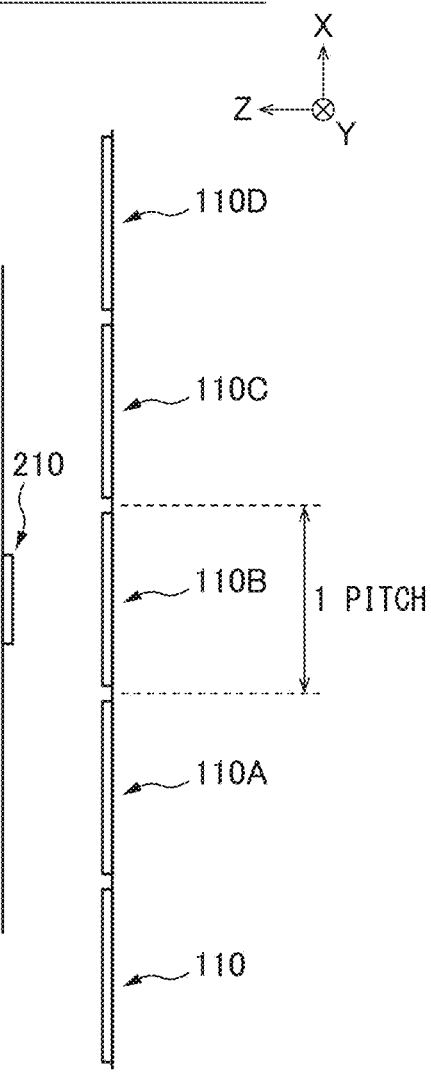
FIG. 5B is a cross-sectional view viewed from a longitudinal direction (X-axis direction) on the horizontal plane for explaining arrangement of the power transmitter circuit 110 and the power receiver circuit 210.
Figure 5C:
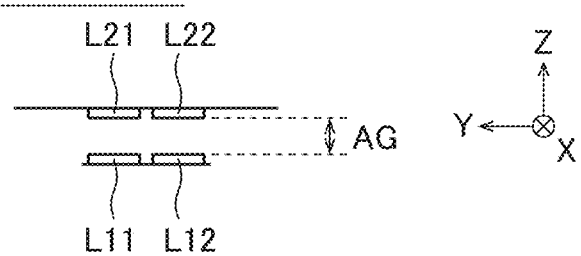
FIG. 5C is a cross-sectional view viewed from a lateral direction (Y-axis direction) on the horizontal plane for explaining arrangement of the power transmitter circuit 110 and the power receiver circuit 210.

The first coil unit (coils L11 and L12) and the second coil unit (coils L21 and L22) are located to face each other. FIG. 4 and FIGS. 5A, 5B and 5C are conceptual diagrams for explaining arrangement of the power transmitter circuit 110 and the power receiver circuit 210. In FIG. 4, perspective views are illustrated. FIG. 5A is a plan view viewed from a vertical direction (Z-axis direction), FIG. 5B is a cross-sectional view viewed from a longitudinal direction (X-axis direction) on the horizontal plane, and FIG. 5C is a cross-sectional view viewed from a lateral direction (Y-axis direction) on the horizontal plane. FIG. 4 and FIGS. 5A, 5B and 5C illustrate a case where the power transmitter device 100 includes a plurality of power transmitter circuits 110, and five first coil units are depicted as an example. In other words, FIG. 4 and FIGS. 5A, 5B and 5C illustrate arrangement of the power transmitter circuits 110 when power is transferred to a moving movable object. Note that in FIG. 4 and FIGS. 5A, 5B and 5C, the structures of the power transmitter circuit 110 and the power receiver circuit 210 as described in FIGS. 2A, 2B and 2C and FIGS. 3A, 3B and 3C are partially omitted.

As illustrated in FIGS. 5A, 5B and 5C, the first coil unit and the second coil unit face each other with a distance AG (referred to as a "distance AG for transmitting/receiving power") apart in the vertical direction. As illustrated in FIG. 4, the plurality of first coil units are attached in a row to the aluminum plate PL1, which is fixedly mounted, for example, on the ground, a road surface, or a floor. The direction (X-axis direction) in which the first coil units are arranged in a row is typically a traveling direction of the route traveled by the movable object. The second coil unit is attached to the aluminum plate PL2 and installed on the movable object, which is a subject for charging. A face FL indicates a portion of the movable object where the second coil unit is installed. When the movable object is a vehicle, the face FL is, for example, a bottom of a body of the vehicle.

As described above, the length of the plurality of first coil units per pitch is configured to be longer than that of the second coil unit in the major axis direction (X-axis direction). In this way, pulsation of the power received by the power receiver coil 211 per pitch can be reduced.

2. Operation

Figure 6:
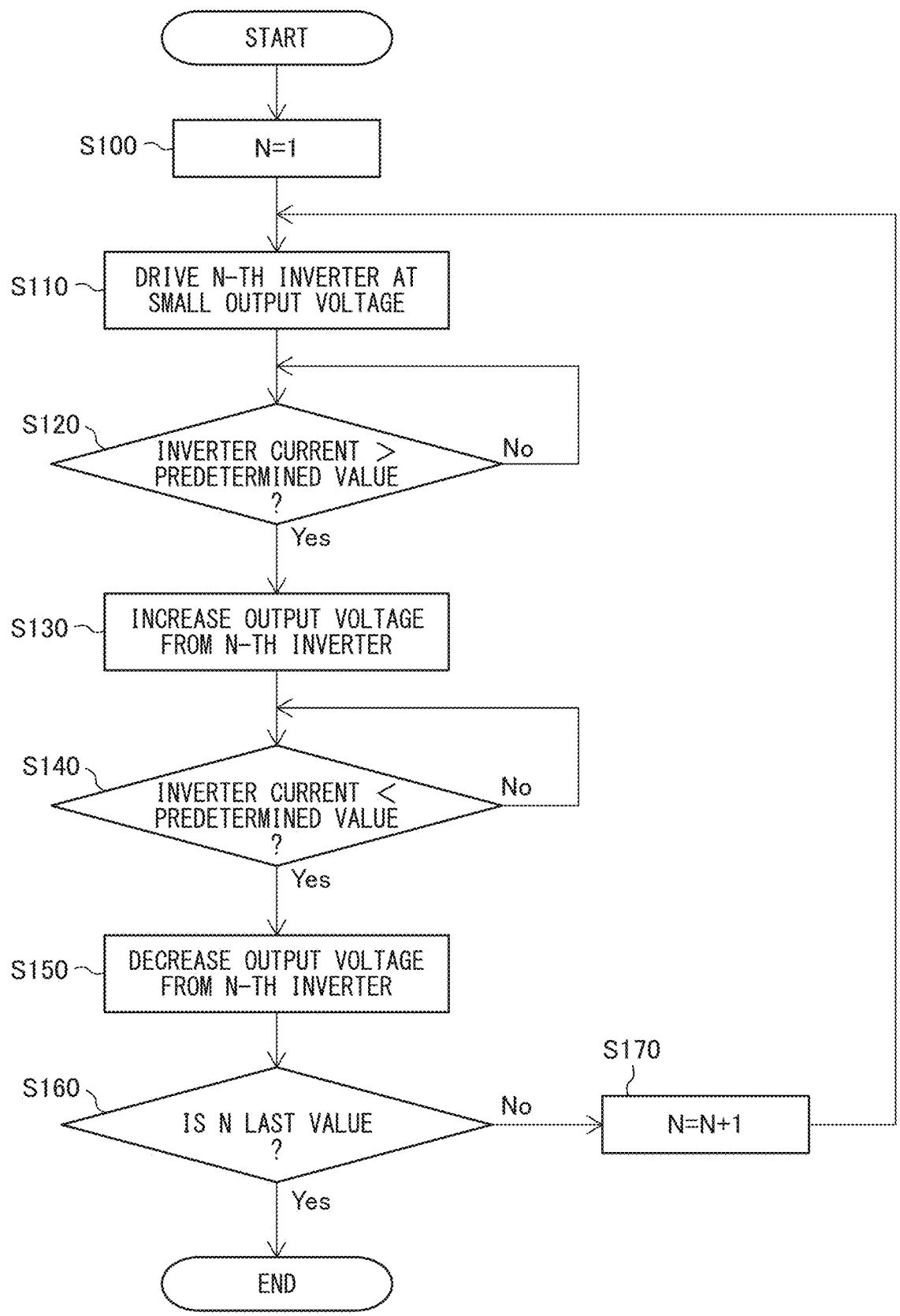
FIG. 6 is a flowchart illustrating an example process of activating and controlling a plurality of inverters 130 of a power transmitter device 100 according to embodiments 1 and 2 of the present disclosure.

To transfer power to the moving movable object, each of the inverters 130 associated with the plurality of power transmitter coils 111 needs to be properly controlled depending on a position of the movable object. FIG. 6 is a flowchart illustrating an example process of activating and controlling the plurality of inverters 130 of the power transmitter device 100 according to embodiments 1 and 2 of the present disclosure.

The process illustrated in FIG. 6 is performed by the controller associated with the inverter 130. The process illustrated in FIG. 6 is started when a condition for activating a first one of the inverters 130 is satisfied. The first one of the inverters 130 is the inverter 130 associated with the power transmitter coil 111 that first transmits power to the movable object. It will be, when the movable object is a vehicle and the power transmitter coils 111 are arranged in a row on a road, the inverter 130 associated with the transmitter coil 111 over which the vehicle passes first. The condition for activating the first one of the inverters 130 is, for example, detection of passing a point that exists before the position of the power transmitter coil 111 to be passed over first and before which there is no divergent path until the power transmitter coil 111 is passed over.

In step S100, the controller sets N, which is a value that indicates the inverter 130 to be controlled, to 1. N corresponds to the numbers of the inverters 130 associated with the power transmitter coils 111 arranged in a row, and N=1 indicates the inverter 130 associated with the power transmitter coil 111 that first transmits power to the movable object. After step S100, the process proceeds to step S110.

In step S110, the controller drives the N-th inverter 130 at a small output voltage. Immediately after the process is started, the value of N will be 1 (N=1), and the first one of the inverters 130 is driven at a small output voltage. After step S110, the process proceeds to step S120.

In step S120, the controller determines whether an output current of the N-th inverter 130 (inverter current) exceeds a predetermined value or not. The inverter current has a characteristic that the current increases as the power receiver coil 211 approaches the power transmitter coil 111 and decreases as the power receiver coil 211 moves away farther from the power transmitter coil 111. Therefore, when the movable object passes over the power transmitter coil 111, the inverter current increases until a position at which the movable object is closest to the power transmitter coil 111 and decreases thereafter. In other words, the controller can judge, by detecting the inverter current of the N-th inverter exceeding the predetermined value, that the movable object has sufficiently approached the N-th inverter 130. The predetermined value here is a value provided to a program in advance and the most suitable value based on experiments or the like.

When the inverter current of the N-th inverter exceeds the predetermined value (Yes in step S120), the process proceeds to step S130. When the inverter current of the N-th inverter does not exceed the predetermined value (No in step S120), processing in step S120 is performed again in the next execution cycle.

In step S130, the controller increases the output voltage from the N-th inverter 130. This is done because the movable object is sufficiently close to the N-th inverter 130 and in order to transmit sufficient power from the power transmitter coil 111 associated with the N-th inverter 130. After step S130, the process proceeds to step S140.

In step S140, the controller determines whether the inverter current of the N-th inverter 130 is lower than a predetermined value or not. As described earlier, the controller can judge, by detecting the inverter current of the N-th inverter falling below the predetermined value, that the movable object has moved a certain distance away from the N-th inverter 130. The predetermined value here is a value provided to a program in advance and the most suitable value based on experiments or the like. The predetermined value here may be equal to or different from the predetermined value in step S120.

When the inverter current of the N-th inverter is lower than the predetermined value (Yes in step S140), the process proceeds to step S150. When the inverter current of the N-th inverter is not lower than the predetermined value (No in step S140), processing in step S140 is performed again in the next execution cycle.

In step S150, the controller decreases the output voltage from the N-th inverter 130. This is done because the movable object is at a certain distance away from the N-th inverter 130 and an effect of power transfer by the power transmitter coil 111 associated with the N-th inverter 130 is small. In this case, the N-th inverter 130 may be deactivated to stop power transfer by the power transmitter coil 111 associated with the N-th inverter 130. After step S150, the process proceeds to step S160.

In step S160, the controller determines whether the N-th inverter 130 is the last inverter or not. This is done by providing the number k of the power transmitter coils 111 to be arranged to a program in advance or obtaining the number and determining whether N is k or not. When the N-th inverter 130 is the last inverter (Yes in step S160), the process is terminated. When the N-th inverter 130 is not the last inverter (No in step S160), the process proceeds to step S170.

In step S170, the controller increments N. After step S170, the process returns to step S110 in the next execution cycle and repeats processing.

With the process described above, each of the plurality of inverters 130 can be controlled depending on the position of the movable object. Note that the process illustrated in FIG. 6 is just an example and an appropriate process may be provided depending on an environment where the wireless power transfer system 10 according to embodiments 1 and 2 of the present disclosure is adapted or the like.

3. Characteristics of the Wireless Power Transfer System 10 According to Embodiment 1

In the wireless power transfer system 10 according to embodiment 1 of the present disclosure, by configuring the pair of coils included in each of the power transmitter coil 111 and the power receiver coil 211 to have a circular shape formed by being wound in the horizontal plane, arranging the pair of cores that induce magnetic fields generated by the coils spaced apart from each other, and providing each core with a core slot that divides the core at a position where the core slot configures the core to be substantially axisymmetric about a centerline that is at the same distance from each coil of the pair of coils as an axis of symmetry, imbalance in magnetic fields generated by the coils of the pair of coils is prevented, and the leakage magnetic field can be successfully reduced. In addition, by configuring the lead wire from the coil disposed on the first face of the core is routed to pass through the core slot to the second face, the second face being a face of the core opposite to the first face, imbalance in magnetic fields generated by the coils of the pair of coils is prevented, and the leakage magnetic field can be successfully reduced.

A comparison is described below among the leakage magnetic field in the wireless power transfer system 10 according to embodiment 1 of the present disclosure, a leakage magnetic field in a wireless power transfer system in which division of the cores is asymmetric, and a leakage magnetic field in a wireless power transfer system in which the cores are not divided. It is assumed that in the wireless power transfer system 10 according to embodiment 1 of the present disclosure, the power transmitter circuits 110 and the power receiver circuits 210 are configured and arranged as illustrated in FIG. 1 to FIGS. 5A, 5B and 5C.

Figure 7A:
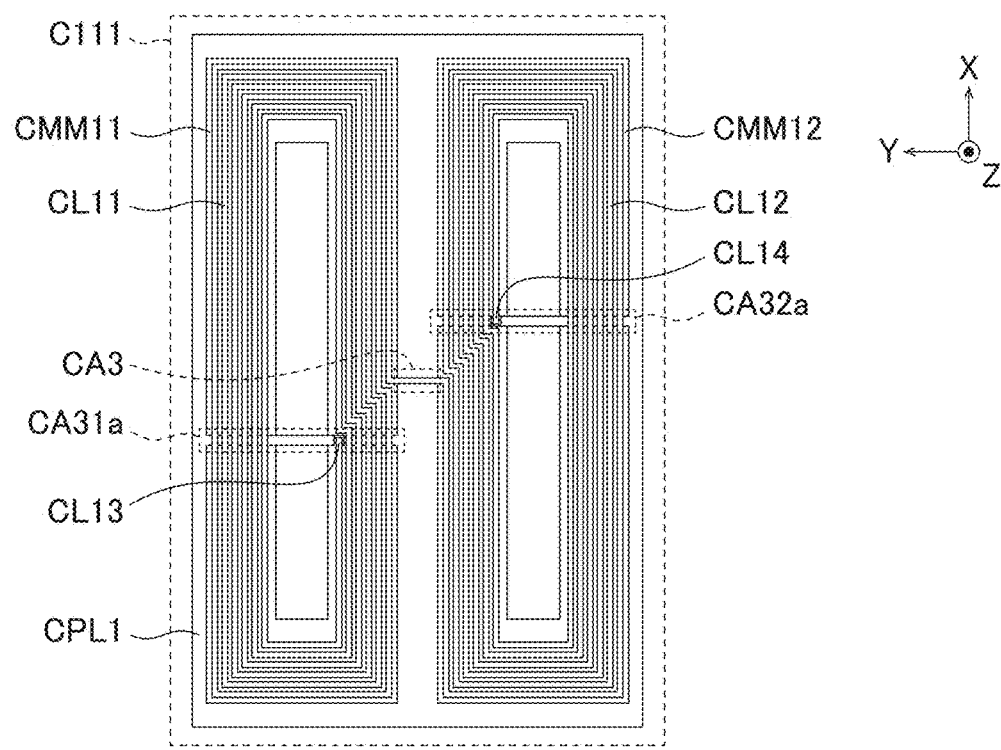
FIG. 7A is a plan view illustrating a configuration of a power transmitter coil C111 of a wireless power transfer system, which is target 1 for comparison.
Figure 7B:
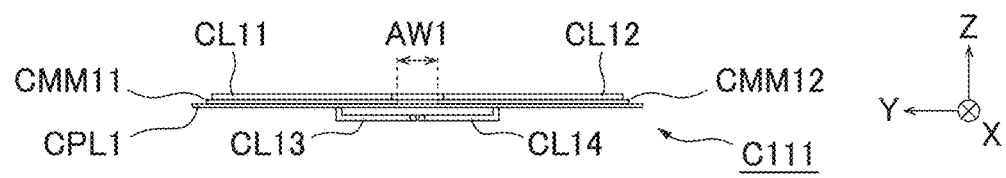
FIG. 7B is a side view illustrating a configuration of a power transmitter coil C111 of a wireless power transfer system, which is target 1 for comparison.
Figure 7C:
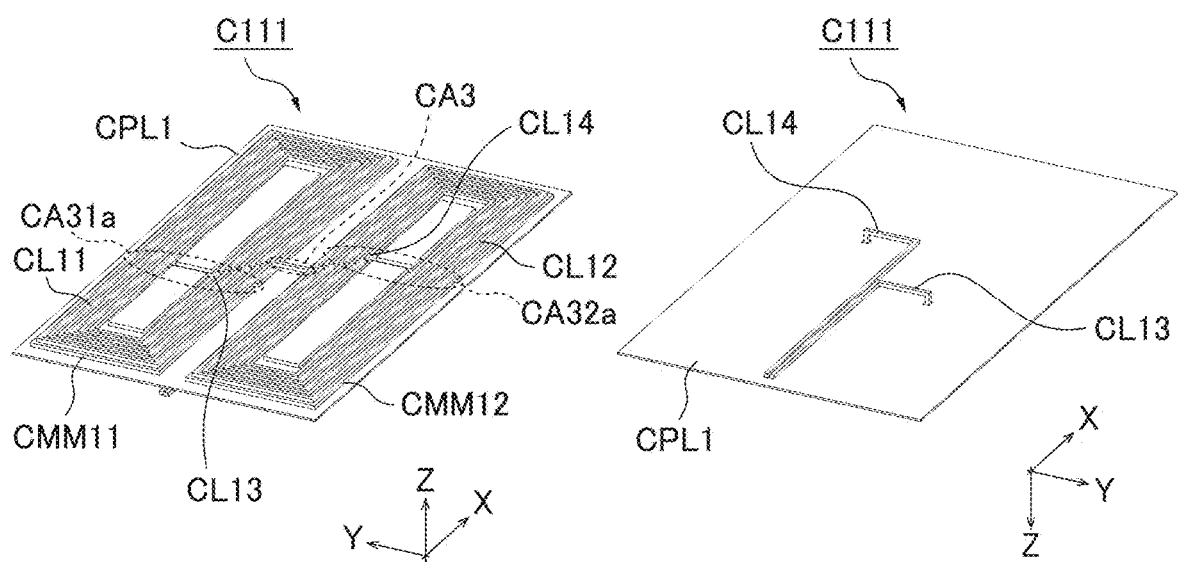
FIG. 7C is a perspective view illustrating a configuration of a power transmitter coil C111 of a wireless power transfer system, which is target 1 for comparison.
Figure 8A:
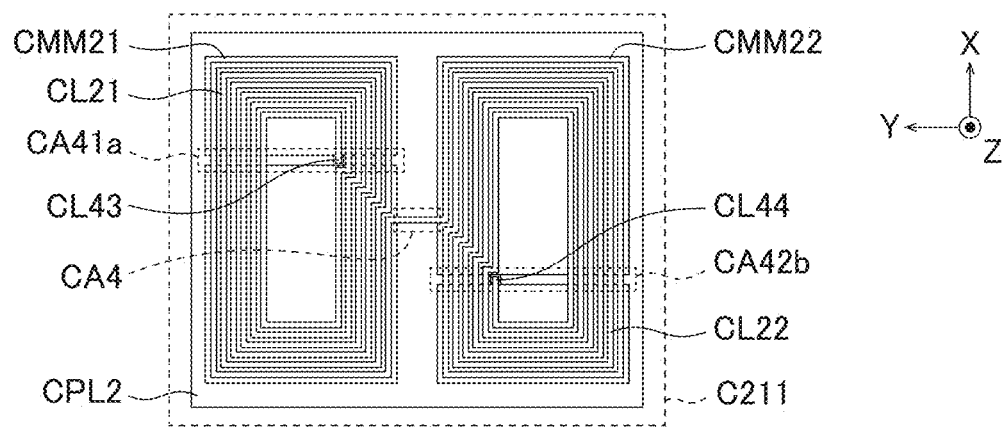
FIG. 8A is a plan view illustrating a configuration of a power receiver coil C211 of the wireless power transfer system of target 1 for comparison.
Figure 8B:
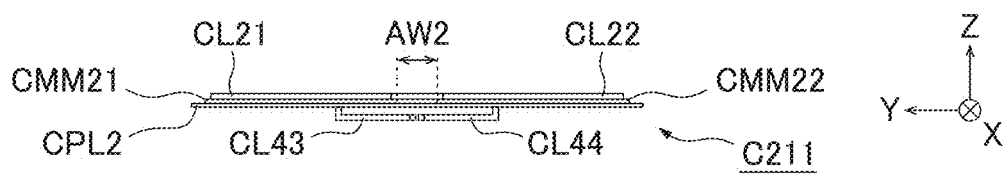
FIG. 8B is a side view illustrating a configuration of a power receiver coil C211 of the wireless power transfer system of target 1 for comparison.
Figure 8C:
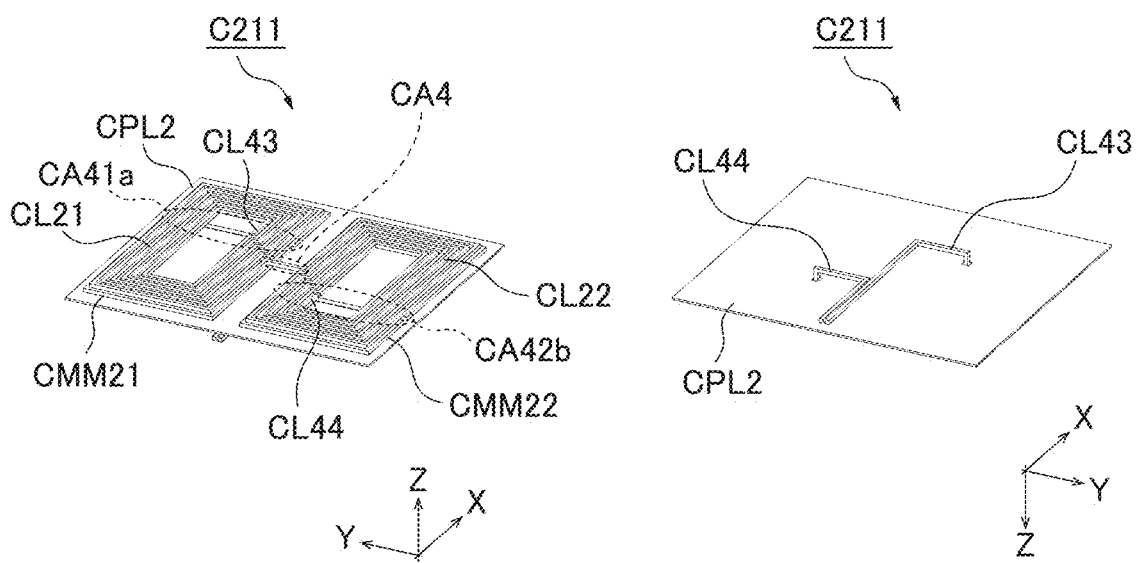
FIG. 8C is a perspective view illustrating a configuration of a power receiver coil C211 of the wireless power transfer system of target 1 for comparison.

FIG. 7A is a plan view illustrating a configuration of a power transmitter coil C111 of a wireless power transfer system, which is target 1 for comparison. FIG. 7B is a side view illustrating a configuration of a power transmitter coil C111 of a wireless power transfer system, which is target 1 for comparison. FIG. 7C is a perspective view illustrating a configuration of a power transmitter coil C111 of a wireless power transfer system, which is target 1 for comparison. FIG. 8A is a plan view illustrating a configuration of a power receiver coil C211 of the wireless power transfer system of target 1 for comparison. FIG. 8B is a side view illustrating a configuration of a power receiver coil C211 of the wireless power transfer system of target 1 for comparison. FIG. 8C is a perspective view illustrating a configuration of a power receiver coil C211 of the wireless power transfer system of target 1 for comparison.

The power transmitter coil C111 of the wireless power transfer system of target 1 for comparison illustrated in FIGS. 7A, 7B and 7C is different from the power transmitter coil 111 of the wireless power transfer system 10 according to embodiment 1 of the present disclosure in that the division of the cores is asymmetric.

As illustrated in FIGS. 7A, 7B and 7C, the power transmitter coil C111 of the wireless power transfer system of target 1 for comparison includes a first coil unit being a pair of coils (coils CL11 and CL12), a first core unit being a pair of cores (cores CMM11 and CMM12), and an aluminum plate CPL1. The coils CL11 and CL12 each have, as illustrated in FIGS. 7A, 7B and 7C, a circular shape formed by being wound in a horizontal plane (X-Y plane). The coils CL11 and CL12 are wound in such a way that the magnetic fields generated by currents are oriented oppositely to each other. In other words, the coil CL11 generates an upward magnetic field with respect to the vertical direction (Z-axis direction) while the coil CL12 generates a downward magnetic field with respect to the vertical direction (Z-axis direction). The coils CL11 and CL12 in the first coil unit are connected to each other by a connecting portion CA3 at points in outside diameter portions of the opposing longer sides of the coils CL11 and CL12.

In the power transmitter coil C111 of target 1 for comparison, division of the cores is asymmetric. In other words, the core slot CA31a and the core slot CA32a are not in a positional relationship in which these core slots are positioned substantially axisymmetric about the centerline that is at the same distance from each of the coils CL11 and CL12 of the pair of coils as an axis of symmetry. More specifically, there is no core slot provided in the core CMM12 that is positioned substantially axisymmetric relative to the core slot CA31a in the core CMM11 about the centerline that is at the same distance from each of the coils CL11 and CL12 of the pair of coils as an axis of symmetry. There is no core slot provided in the core CMM11 that is positioned substantially axisymmetric relative to the core slot CA32a in the core CMM12 about the centerline that is at the same distance from each of the coils CL11 and CL12 of the pair of coils as an axis of symmetry.

The lead wire CL13 from a coil end opposite to the coil end of the coil CL11 that runs to the connecting portion CA3 is routed from inside diameter sides (the innermost portion of the loop of the coil CL11) of the adjacent longer sides of the pair of coils CL11 and CL12, the longer sides being opposed to each other. The lead wire CL13 is routed through the core slot CA31a from a first face of the core CMM11 on which the coil CL11 is provided to a second face that is the face of the core CMM11 opposite to the first face, and further routed to pass through a hole provided in the aluminum plate CPL1 to the backside (the face opposite to the face that is in contact with the core CMM11) of the aluminum plate CPL1.

The lead wire CL14 from a coil end opposite to the coil end of the coil CL12 that runs to the connecting portion CA3 is routed from inside diameter sides (the innermost portion of the loop of the coil CL12) of the adjacent longer sides of the pair of coils CL11 and CL12, the longer sides being opposed to each other. The lead wire CL14 is routed through the core slot CA32a from a first face of the core CMM12 on which the coil CL12 is provided to a second face that is the face of the core CMM12 opposite to the first face, and further routed to pass through a hole provided in the aluminum plate CPL1 to the backside (the face opposite to the face that is in contact with the core CMM12) of the aluminum plate CPL1.

The cores CMM11 and CMM12 in the first core unit are made of a magnetic material and respectively induce magnetic fields generated by the coils CL11 and CL12 in the first coil unit. The cores CMM11 and CMM12 are typically composed of ferrite.

The cores CMM11 and CMM12 in the first core unit are respectively integrated with the coils CL11 and CL12 in the first coil unit, and the cores are arranged side by side with the first inter-core distance AW1 apart in the horizontal direction (Y-axis direction).

The aluminum plate CPL1 is a shield unit that is disposed under the coils CL11 and CL12 and the cores CMM11 and CMM12, and that reduces an effect of an external magnetic field on the power transmitter coil C111. The first coil unit, the first core unit, and the aluminum plate CPL1 are arranged in this order to be overlapped with each other.

The power receiver coil C211 of the wireless power transfer system of target 1 for comparison illustrated in FIGS. 8A, 8B and 8C is different from the power transmitter coil 111 of the wireless power transfer system 10 according to embodiment 1 of the present disclosure in that the division of the cores is asymmetric.

As illustrated in FIGS. 8A, 8B and 8C, the power receiver coil C211 of the wireless power transfer system of target 1 for comparison includes a second coil unit being a pair of coils (coils CL21 and CL22), a second core unit being a pair of cores (cores CMM21 and CMM22), and an aluminum plate CPL2. The coils CL21 and CL22 each have, as illustrated in FIGS. 8A, 8B and 8C, a circular shape formed by being wound in the horizontal plane (X-Y plane). The coils CL21 and CL22 are wound in such a way that the magnetic fields generated by currents are oriented oppositely to each other. The coils CL21 and CL22 in the second coil unit are connected to each other by a connecting portion CA4 at points in outside diameter portions of the opposing longer sides of the coils CL21 and CL22.

In the power receiver coil C211 of target 1 for comparison, division of the cores is asymmetric. In other words, the core slot CA41a and the core slot CA42b are not in a positional relationship in which these core slots are positioned substantially axisymmetric about the centerline that is at the same distance from each of the coils CL21 and CL22 of the pair of coils as an axis of symmetry More specifically, there is no core slot provided in the core CMM22 that is positioned substantially axisymmetric relative to the core slot CA41a in the core CMM21 about the centerline that is at the same distance from each of the coils CL21 and CL22 of the pair of coils as an axis of symmetry. There is no core slot provided in the core CMM21 that is positioned substantially axisymmetric relative to the core slot CA42b in the core CMM22 about the centerline that is at the same distance from each of the coils CL21 and CL22 of the pair of coils as an axis of symmetry.

The lead wire CL43 from a coil end opposite to the coil end of the coil CL21 that runs to the connecting portion CA4 is routed from inside diameter sides (the innermost portion of the loop of the coil CL21) of the adjacent longer sides of the pair of coils CL21 and CL22, the longer sides being opposed to each other. The lead wire CL43 is routed through the core slot CA41a from a first face of the core CMM21 on which the coil CL21 is provided to a second face that is the face of the core CMM21 opposite to the first face, and further routed to pass through a hole provided in the aluminum plate CPL2 to the backside (the face opposite to the face that is in contact with the core CMM21) of the aluminum plate CPL2.

The lead wire CL44 from a coil end opposite to the coil end of the coil CL22 that runs to the connecting portion CA4 is routed from inside diameter sides (the innermost portion of the loop of the coil CL22) of the adjacent longer sides of the pair of coils CL21 and CL22, the longer sides being opposed to each other. The lead wire CL44 is routed through the core slot CA42b from a first face of the core CMM22 on which the coil CL22 is provided to a second face that is the face of the core CMM22 opposite to the first face, and further routed to pass through a hole provided in the aluminum plate CPL2 to the backside (the face opposite to the face that is in contact with the core CMM12) of the aluminum plate CPL2.

The cores CMM21 and CMM22 in the second core unit are made of a magnetic material and respectively induce magnetic fields generated by the coils CL21 and CL22 in the second coil unit. The cores CMM21 and CMM22 are typically composed of ferrite.

The cores CMM21 and CMM22 in the second core unit are respectively integrated with the coils CL21 and CL22 in the second coil unit, and the cores are arranged side by side with the second inter-core distance AW2 apart in the horizontal direction (Y-axis direction).

The aluminum plate CPL2 is a shield unit that is disposed under the coils CL21 and CL22 and the cores CMM21 and CMM22, and that reduces an effect of an external magnetic field on the power receiver coil C211. The second coil unit, the second core unit, and the aluminum plate CPL2 are arranged in this order to be overlapped with each other.

FIG. 9A is a diagram illustrating a legend of magnetic flux density in X direction for FIGS. 9B and 9C. FIG. 9B is a diagram illustrating distributions of magnetic flux densities in the X direction (the direction of travel of a vehicle) inside a core of the power transmitter coil C111 of target 1 for comparison when power of 30 kW is transmitted. FIG. 9C is a diagram illustrating distributions of magnetic flux densities in the X direction (the direction of travel of a vehicle) inside a core of the power transmitter coil 111 according to embodiment 1 of the present disclosure when power of 30 kW is transmitted. As illustrated in FIG. 9B, in the power transmitter coil C111 of target 1 for comparison, the core slot CA31a and the core slot CA32a are not in a positional relationship in which these core slots are positioned substantially axisymmetric about the centerline that is at the same distance from each of the coils CL11 and CL12 of the pair of coils as an axis of symmetry, and division of the cores is asymmetric; the magnetoresistance is therefore asymmetric and magnetic fields in the X direction generated by the pair of coils CL11 and CL12 have different intensity and are asymmetric (imbalanced). In contrast, as illustrated in FIG. 9C, in the power transmitter coil 111 according to embodiment 1 of the present disclosure, the magnetic fields in the X direction generated by the pair of coils L11 and L12 are equal in intensity, and the asymmetric property is reduced.

Figure 10:
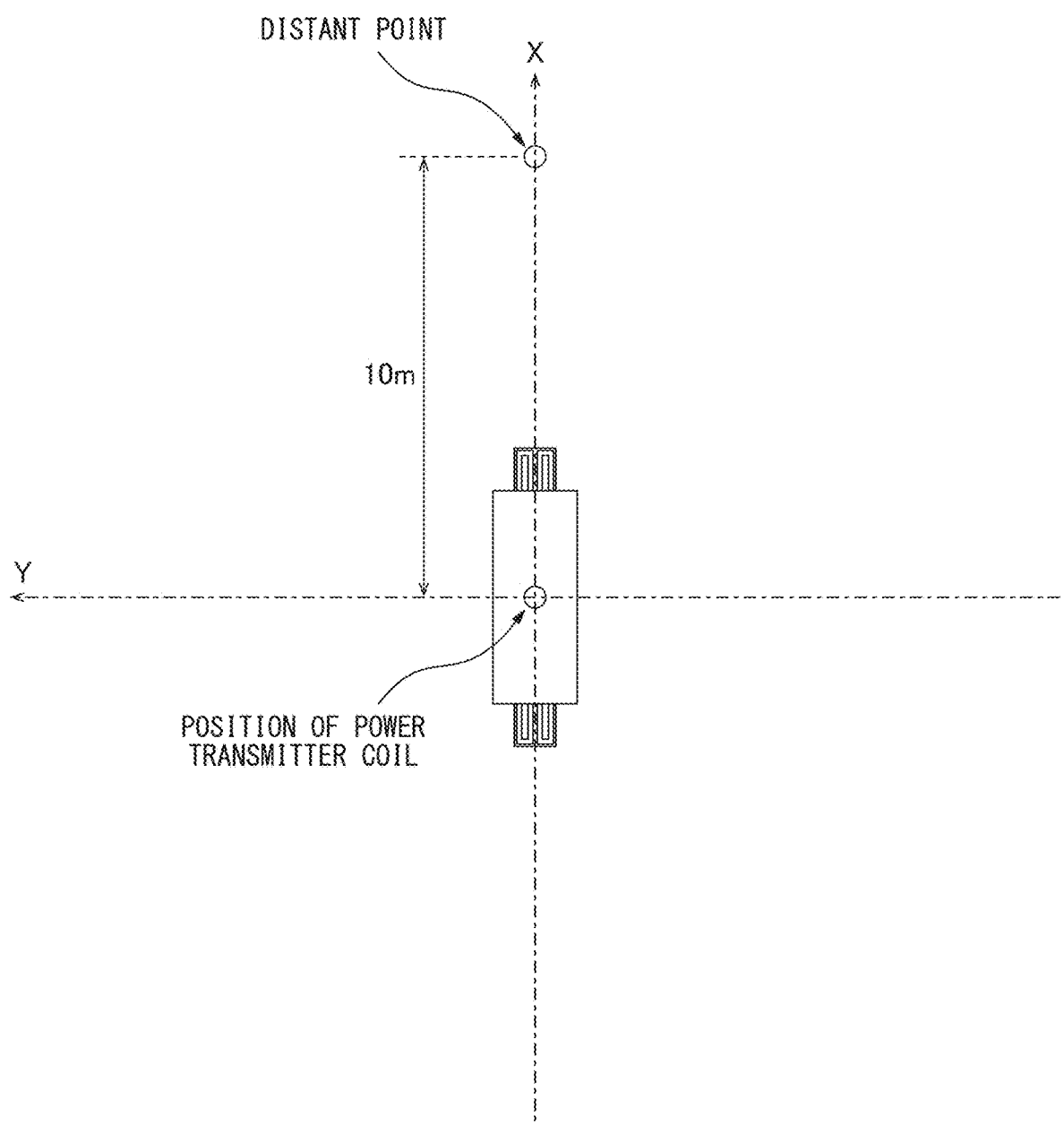
FIG. 10 is a diagram depicting a measurement point for a distant leakage magnetic field in the X direction in the wireless power transfer system.
Figure 11:
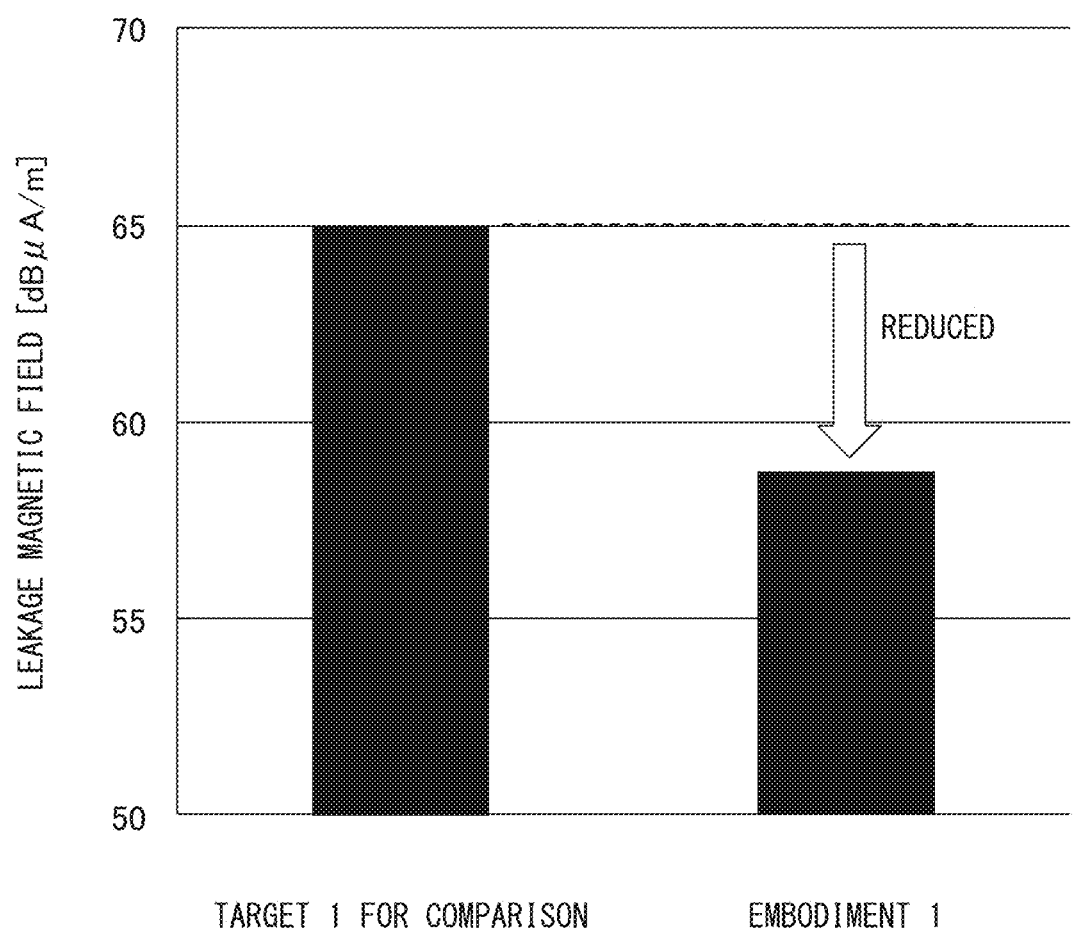
FIG. 11 is a diagram illustrating a comparison result of distant leakage magnetic fields in the X direction at a 10 m point depicted in FIG. 10 in the wireless power transfer system of target 1 for comparison (FIGS. 7A, 7B and 7C and FIGS. 8A, 8B and 8C) and the wireless power transfer system 10 according to embodiment 1 of the present disclosure (FIG. 1 to FIG. 5C).

FIG. 10 is a diagram depicting a measurement point for a distant leakage magnetic field in the X direction in the wireless power transfer system. For example, when the movable object that will be the subject for charging is a vehicle and the power transmitter coils (first coil units) are arranged in a row on a road that will be the route traveled by the vehicle, assuming the center of the power transmitter coil as a starting point, a distant point that is about 10 m distant from the starting point in the direction of travel of the vehicle (X-axis direction) is determined as a measurement point for the distant leakage magnetic field in the X direction. FIG. 11 is a diagram illustrating a comparison result of distant leakage magnetic fields in the X direction at a 10 m point depicted in FIG. 10 in the wireless power transfer system of target 1 for comparison (FIGS. 7A, 7B and 7C and FIGS. 8A, 8B and 8C) and the wireless power transfer system 10 according to embodiment 1 of the present disclosure (FIG. 1 to FIG. 5C). It is found that, as illustrated in FIG. 11, the wireless power transfer system 10 according to embodiment 1 of the present disclosure (FIG. 1 to FIG. 5C) reduces the distant leakage magnetic field by about 6 dB compared to the wireless power transfer system of target 1 for comparison (FIGS. 7A, 7B and 7C and FIGS. 8A, 8B and 8C).

Figure 12A:
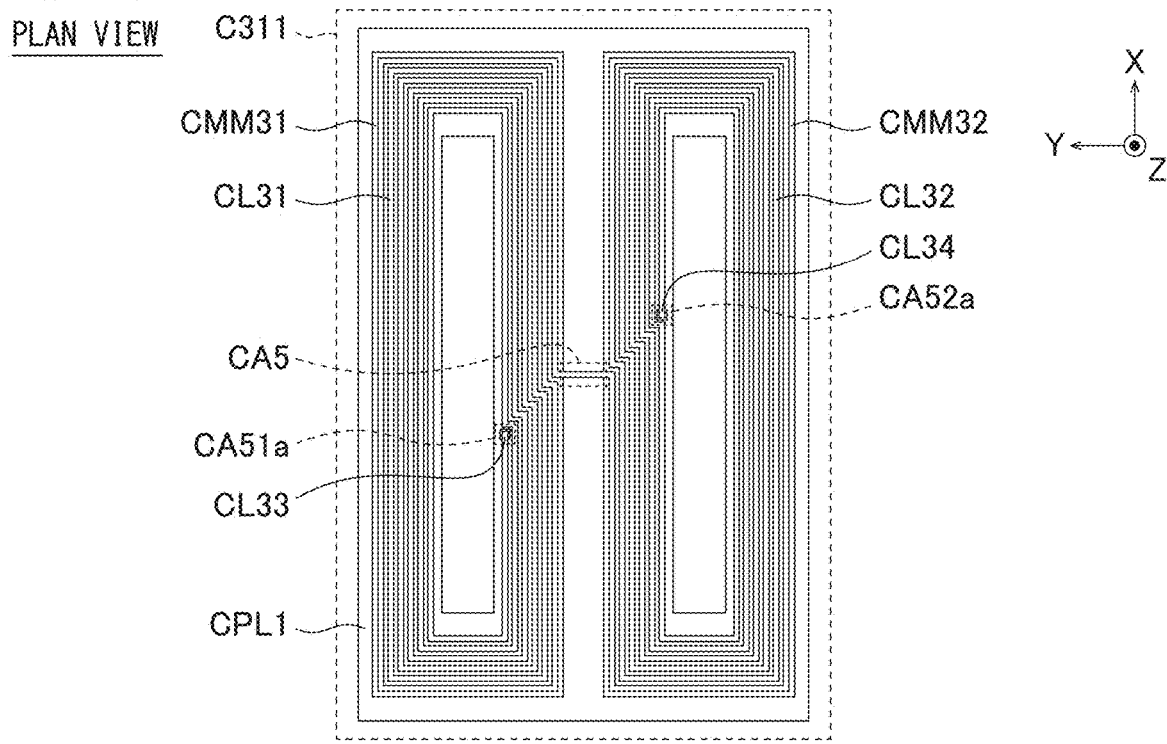
FIG. 12A is a plan view illustrating a configuration of a power transmitter coil C311 of a wireless power transfer system, which is target 2 for comparison.
Figure 12B:
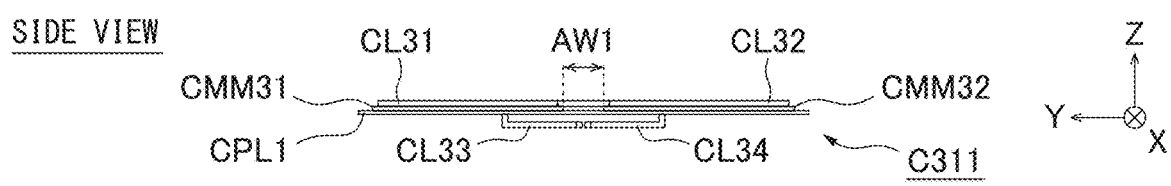
FIG. 12B is a side view illustrating a configuration of a power transmitter coil C311 of a wireless power transfer system, which is target 2 for comparison.
Figure 12C:
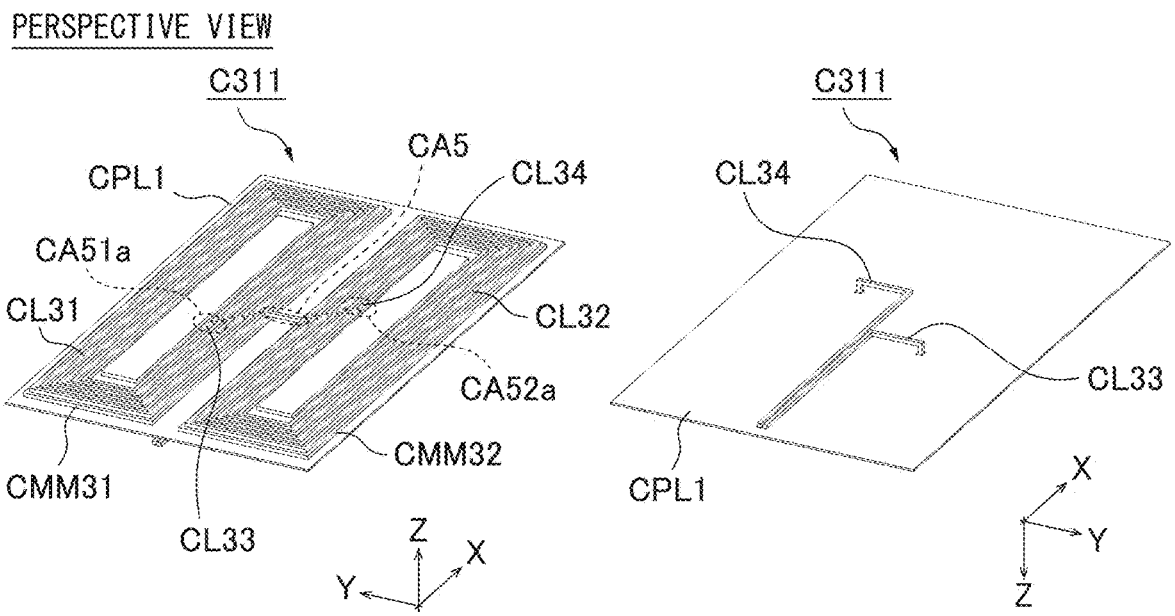
FIG. 12C is a perspective view illustrating a configuration of a power transmitter coil C311 of a wireless power transfer system, which is target 2 for comparison.
Figure 13A:
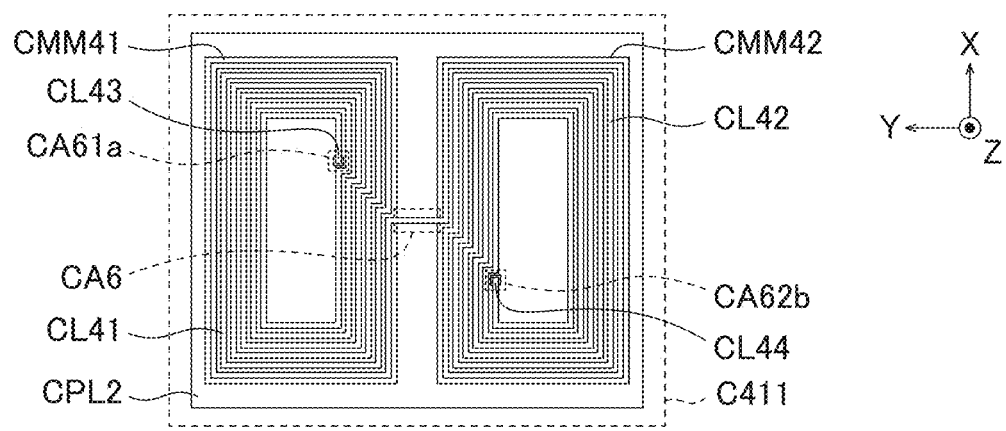
FIG. 13A is a plan view illustrating a configuration of a power receiver coil C411 of the wireless power transfer system of target 2 for comparison.
Figure 13B:
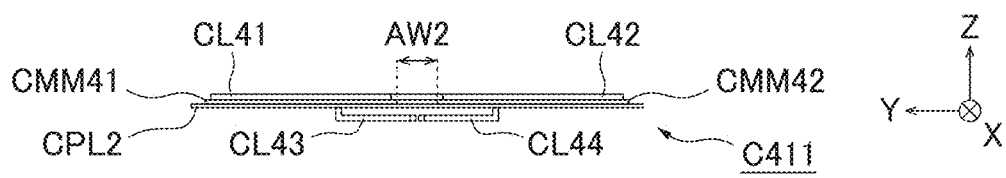
FIG. 13B is a side view illustrating a configuration of a power receiver coil C411 of the wireless power transfer system of target 2 for comparison.
Figure 13C:
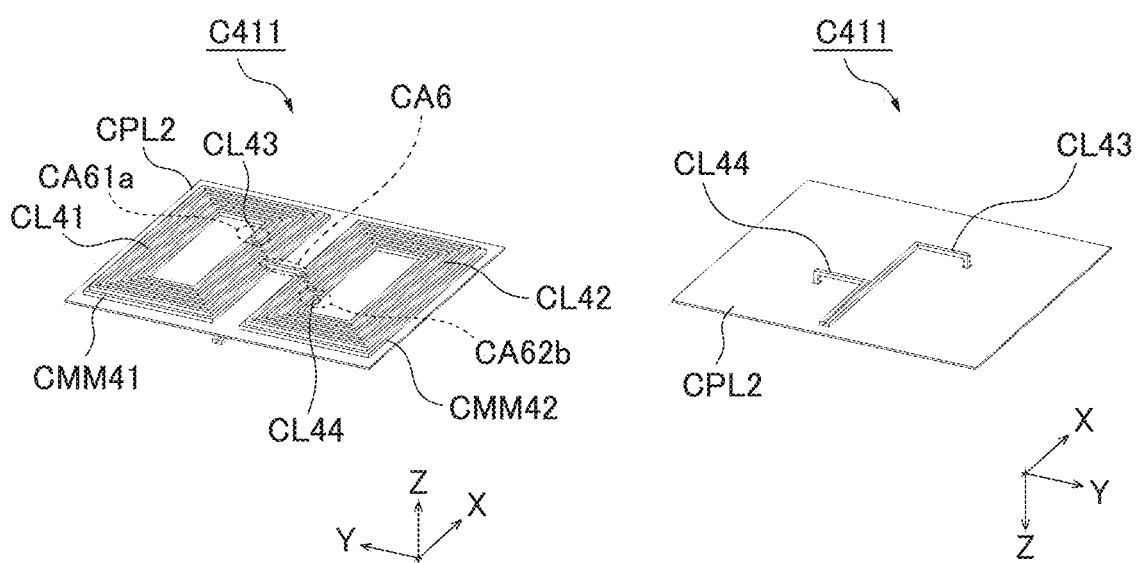
FIG. 13C is a perspective view illustrating a configuration of a power receiver coil C411 of the wireless power transfer system of target 2 for comparison.

FIG. 12A is a plan view illustrating a configuration of a power transmitter coil C311 of a wireless power transfer system, which is target 2 for comparison. FIG. 12B is a side view illustrating a configuration of a power transmitter coil C311 of a wireless power transfer system, which is target 2 for comparison. FIG. 12C is a perspective view illustrating a configuration of a power transmitter coil C311 of a wireless power transfer system, which is target 2 for comparison. FIG. 13A is a plan view illustrating a configuration of a power receiver coil C411 of the wireless power transfer system of target 2 for comparison. FIG. 13B is a side view illustrating a configuration of a power receiver coil C411 of the wireless power transfer system of target 2 for comparison. FIG. 13C is a perspective view illustrating a configuration of a power receiver coil C411 of the wireless power transfer system of target 2 for comparison.

The power transmitter coil C311 of the wireless power transfer system of target 2 for comparison illustrated in FIGS. 12A, 12B and 12C is different from the power transmitter coil 111 of the wireless power transfer system 10 according to embodiment 1 of the present disclosure in that the cores are not divided and a hole is provided in the cores.

As illustrated in FIGS. 12A, 12B and 12C, the power transmitter coil C311 of the wireless power transfer system of target 2 for comparison includes a first coil unit being a pair of coils (coils CL31 and CL32), a first core unit being a pair of cores (cores CMM31 and CMM32), and an aluminum plate CPL1. The coils CL31 and CL32 each have, as illustrated in FIGS. 12A, 12B and 12C, a circular shape formed by being wound in a horizontal plane (X-Y plane). The coils CL31 and CL32 are wound in such a way that the magnetic fields generated by currents are oriented oppositely to each other. In other words, the coil CL31 generates an upward magnetic field with respect to the vertical direction (Z-axis direction) while the coil CL32 generates a downward magnetic field with respect to the vertical direction (Z-axis direction). The coils CL31 and CL32 in the first coil unit are connected to each other by a connecting portion CA5 at points in outside diameter portions of the opposing longer sides of the coils CL31 and CL32.

In the power transmitter coil C111 of target 2 for comparison, the cores are not divided. In other words, there is no core slot that divides the core provided in the cores CMM31 and CMM32, and holes CA51a and CA52a are provided instead.

The lead wire CL33 from a coil end opposite to the coil end of the coil CL31 that runs to the connecting portion CA5 is routed from inside diameter sides (the innermost portion of the loop of the coil CL31) of the adjacent longer sides of the pair of coils CL31 and CL32, the longer sides being opposed to each other. The lead wire CL33 is routed through the hole CA51a provided in the core CMM31 from a first face of the core CMM31 on which the coil CL31 is provided to a second face that is the face of the core CMM31 opposite to the first face, and further routed to pass through a hole provided in the aluminum plate CPL1 to the backside (the face opposite to the face that is in contact with the core CMM31) of the aluminum plate CPL1.

The lead wire CL34 from a coil end opposite to the coil end of the coil CL32 that runs to the connecting portion CA5 is routed from inside diameter sides (the innermost portion of the loop of the coil CL32) of the adjacent longer sides of the pair of coils CL31 and CL32, the longer sides being opposed to each other. The lead wire CL34 is routed through the hole CA52a provided in the core CMM32 from a first face of the core CMM32 on which the coil CL32 is provided to a second face that is the face of the core CMM32 opposite to the first face, and further routed to pass through a hole provided in the aluminum plate CPL1 to the backside (the face opposite to the face that is in contact with the core CMM32) of the aluminum plate CPL1.

The cores CMM31 and CMM32 in the first core unit are made of a magnetic material and respectively induce magnetic fields generated by the coils CL31 and CL32 in the first coil unit. The cores CMM31 and CMM32 are typically composed of ferrite.

The cores CMM31 and CMM32 in the first core unit are respectively integrated with the coils CL31 and CL32 in the first coil unit, and the cores are arranged side by side with the first inter-core distance AW1 apart in the horizontal direction (Y-axis direction).

The aluminum plate CPL1 is a shield unit that is disposed under the coils CL31 and CL32 and the cores CMM31 and CMM32, and that reduces an effect of an external magnetic field on the power transmitter coil C311. The first coil unit, the first core unit, and the aluminum plate CPL1 are arranged in this order to be overlapped with each other.

The power receiver coil C411 of the wireless power transfer system of target 2 for comparison illustrated in FIGS. 13A, 13B and 13C is different from the power transmitter coil 111 of the wireless power transfer system 10 according to embodiment 1 of the present disclosure in that the cores are not divided and a hole is provided in the cores.

As illustrated in FIGS. 13A, 13B and 13C, the power receiver coil C411 of the wireless power transfer system of target 2 for comparison includes a second coil unit being a pair of coils (coils CL41 and CL42), a second core unit being a pair of cores (cores CMM41 and CMM42), and an aluminum plate CPL2. The coils CL41 and CL42 each have, as illustrated in FIGS. 13A, 13B and 13C, a circular shape formed by being wound in the horizontal plane (X-Y plane). The coils CL41 and CL42 are wound in such a way that the magnetic fields generated by currents are oriented oppositely to each other. The coils CL41 and CL42 in the second coil unit are connected to each other by a connecting portion CA6 at points in outside diameter portions of the opposing longer sides of the coils CL41 and CL42.

In the power receiver coil C411 of target 2 for comparison, the cores are not divided. In other words, there is no core slot that divides the core provided in the cores CMM41 and CMM42, and holes CA61a and CA62b are provided instead.

The lead wire CL43 from a coil end opposite to the coil end of the coil CL41 that runs to the connecting portion CA6 is routed from inside diameter sides (the innermost portion of the loop of the coil CL41) of the adjacent longer sides of the pair of coils CL41 and CL42, the longer sides being opposed to each other. The lead wire CL43 is routed through the hole CA61a provided in the core CMM41 from a first face of the core CMM41 on which the coil CL41 is provided to a second face that is the face of the core CMM41 opposite to the first face, and further routed to pass through a hole provided in the aluminum plate CPL2 to the backside (the face opposite to the face that is in contact with the core CMM41) of the aluminum plate CPL2.

The lead wire CL44 from a coil end opposite to the coil end of the coil CL42 that runs to the connecting portion CA6 is routed from inside diameter sides (the innermost portion of the loop of the coil CL42) of the adjacent longer sides of the pair of coils CL41 and CL42, the longer sides being opposed to each other. The lead wire CL44 is routed through the hole CA62b provided in the core CMM42 from a first face of the core CMM42 on which the coil CL42 is provided to a second face that is the face of the core CMM42 opposite to the first face, and further routed to pass through a hole provided in the aluminum plate CPL2 to the backside (the face opposite to the face that is in contact with the core CMM42) of the aluminum plate CPL2.

The cores CMM41 and CMM42 in the second core unit are made of a magnetic material and respectively induce magnetic fields generated by the coils CL41 and CL42 in the second coil unit. The cores CMM41 and CMM42 are typically composed of ferrite.

The cores CMM41 and CMM42 in the second core unit are respectively integrated with the coils CL41 and CL42 in the second coil unit, and the cores are arranged side by side with the second inter-core distance AW2 apart in the horizontal direction (Y-axis direction).

The aluminum plate CPL2 is a shield unit that is disposed under the coils CL41 and CL42 and the cores CMM41 and CMM42, and that reduces an effect of an external magnetic field on the power receiver coil C411. In other words, the second coil unit, the second core unit, and the aluminum plate CPL2 are arranged in this order to be overlapped with each other.

FIG. 14A is a diagram illustrating the distribution of a magnetic flux density inside a core of the power transmitter coil C311 of target 2 for comparison when power of 30 kW is transmitted. FIG. 14B is a diagram illustrating a legend of magnetic flux density inside for FIG. 14A. As illustrated in FIGS. 14A and 14B, in the power transmitter coil C311 of target 2 for comparison, there is no axisymmetric core slot provided in the cores CMM31 and CMM32 and holes CA51a and CA52a for the lead wires CL33 and CL34 to pass through are provided in the cores CMM31 and CMM32; as a result, the magnetic fields generated by the lead wires that pass through the holes CA51a and CA52a provided in the cores CMM31 and CMM32 causes local saturation in the cores CMM31 and CMM32. In addition, iron loss will be significantly increased.

4. Power Transmitter Circuit and Power Receiver Circuit According to Embodiment 2

4-1. Power Transmitter Circuit According to Embodiment 2

Figure 15A:
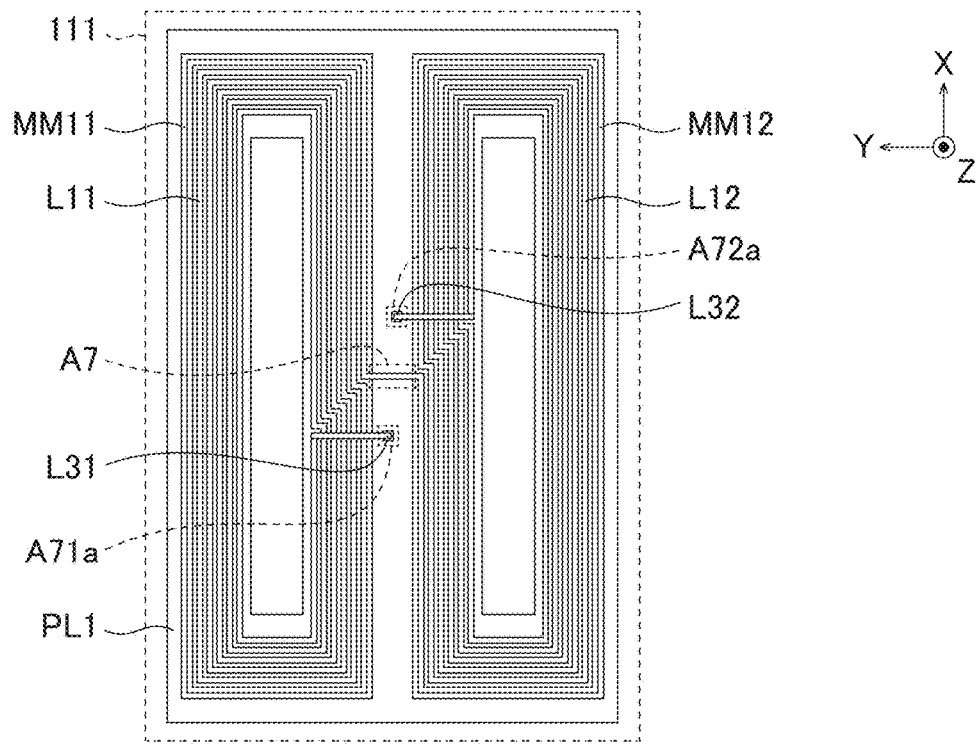
FIG. 15A is a plan view viewed from a vertical direction (Z-axis direction) for explaining a configuration of the power transmitter circuit 110 according to embodiment 2 of the present disclosure.
Figure 15B:
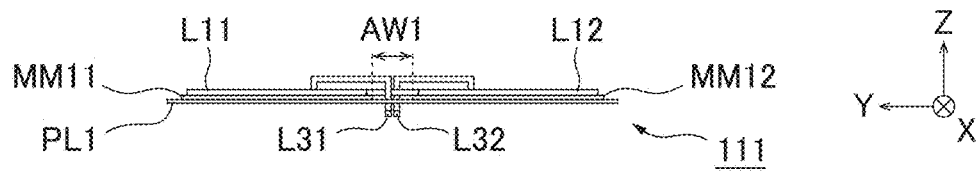
FIG. 15B is a side view viewed from a longitudinal direction (X-axis direction) on the horizontal plane for explaining a configuration of the power transmitter circuit 110 according to embodiment 2 of the present disclosure.
Figure 15C:
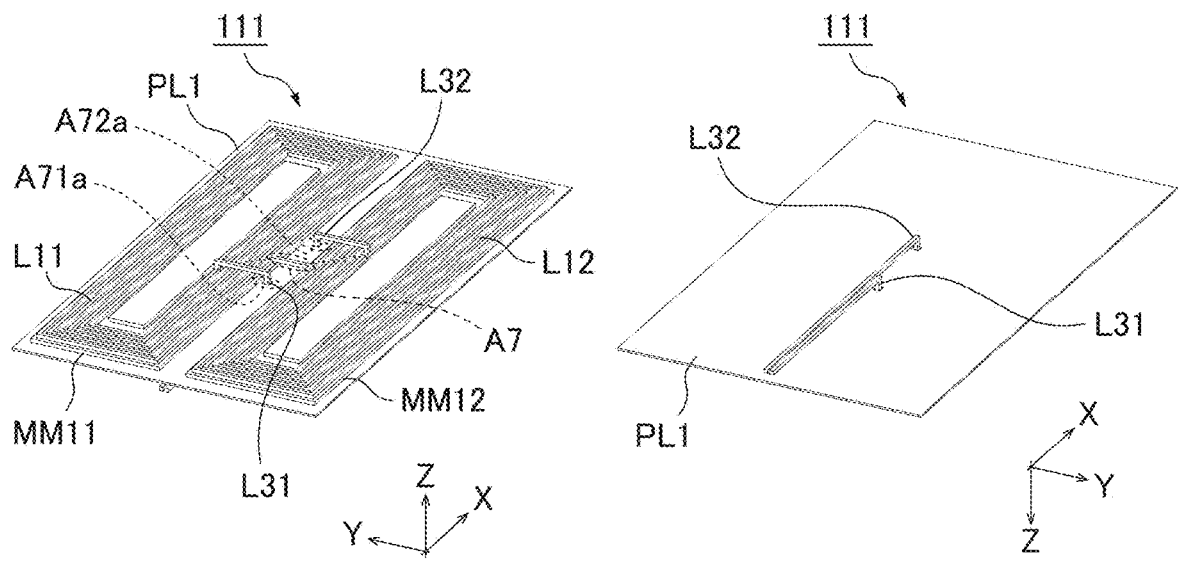
FIG. 15C is a perspective view for explaining a configuration of the power transmitter circuit 110 according to embodiment 2 of the present disclosure.

FIGS. 15A, 15B and 15C are conceptual diagrams for explaining a configuration of the power transmitter circuit 110 according to embodiment 2 of the present disclosure. With respect to the power transmitter circuit 110 positioned on a horizontal plane (X-Y plane), FIG. 15A is a plan view viewed from a vertical direction (Z-axis direction), FIG. 15B is a side view viewed from a longitudinal direction (X-axis direction) on the horizontal plane, and FIG. 15C is a perspective view. The power transmitter circuit 110 is a resonant circuit constructed from the power transmitter coil 111 and the capacitors C11 and C12 as described above.

The power transmitter coil 111 includes a first coil unit being a pair of coils (coils L11 and L12), a first core unit being a pair of cores (cores MM11 and MM12), and an aluminum plate PL1. The coils L11 and L12 and the cores MM11 and MM12 are held by a plastic component or the like (not illustrated).

Each of the coils L11 and L12 in the first coil unit has, as illustrated in FIGS. 15A, 15B and 15C, a circular shape formed by being wound in the horizontal plane (X-Y plane). The coils L11 and L12 are connected to each other at one end thereof by a connecting portion A7, and they are wound in such a way that the magnetic fields generated by currents are oriented oppositely to each other. In other words, the coil L11 generates, for example, an upward magnetic field with respect to the vertical direction (Z-axis direction) while the coil L12 generates, for example, a downward magnetic field with respect to the vertical direction (Z-axis direction).

The cores MM11 and MM12 in the first core unit are made of a magnetic material and respectively induce magnetic fields generated by the coils L11 and L12 in the first coil unit. The cores MM11 and MM12 are typically composed of ferrite.

The cores MM11 and MM12 in the first core unit are respectively integrated with the coils L11 and L12 in the first coil unit, and the cores are arranged side by side with the first inter-core distance AW1 apart in the horizontal direction (Y-axis direction).

Each of the coils L11 and L12 in the first coil unit has two longer sides (in FIGS. 15A, 15B and 15C, the sides of the coil along the X-axis direction, which is a major axis direction) and two shorter sides (in FIGS. 15A, 15B and 15C, the sides of the coil along the Y-axis direction, which is a minor axis direction). The coils L11 and L12 in the first coil unit are connected to each other by the connecting portion A7 at points in outside diameter portions of the opposing longer sides of the coils L11 and L12. In other words, the connecting portion A7 is provided on outside diameter sides of the adjacent longer sides of the pair of coils L11 and L12, the longer sides being opposed to each other (in an area between the coils L11 and L12).

The aluminum plate PL1 is a shield unit that is disposed under the coils L11 and L12 and the cores MM11 and MM12, and that reduces an effect of an external magnetic field on the power transmitter circuit 110. The aluminum plate PL1 is disposed on a face of the two faces of the first core unit that is opposite to the face on which the first coil unit is provided. In other words, the first coil unit, the first core unit, and the aluminum plate PL1 are arranged in this order to be overlapped with each other. In addition, since the cores MM11 and MM12 are arranged side by side with the first inter-core distance AW1 apart in the horizontal direction (Y-axis direction), when the cores MM11 and MM12 are viewed from the vertical direction (Z-axis direction) in which the coils L11 and L12 are provided, the aluminum plate PL1 is exposed between the cores MM11 and MM12 and can be visually recognized. In this aluminum plate PL1 exposed between the cores MM11 and MM12, holes A71a and A72a are provided. It is preferred that the holes A71a and A72a in the aluminum plate PL1 are in a positional relationship in which these holes are substantially point-symmetric about a substantially central point of the connecting portion A7 as a point of symmetry.

To prevent increase in the physical size of the power transmitter coil 111, lead wires L31 and L32 of the coils L11 and L12 in the first coil unit are respectively routed to a backside of the first core unit and the aluminum plate PL1 via the holes A71a and A72a. Providing the core slots in the first core unit for the lead wires of the coils to pass through causes imbalance in magnetoresistance of the coils L11 and L12, and the magnetic field generated by the lead wires cause saturation in the first core unit. To prevent this saturation, the first core unit is configured in such a way that the lead wires of the coils pass through the holes A71a and A72a provided in the aluminum plate between the pair of cores MM11 and MM12 arranged with the first inter-core distance AW1 apart. Further details will be described below.

The lead wire L31 for connecting a coil end opposite to the coil end of the coil L11 that runs to the connecting portion A7 with the capacitor C11 in FIG. 1 is routed from inside diameter sides (the innermost portion of the loop of the coil L11) of the adjacent longer sides of the pair of coils L11 and L12, the longer sides being opposed to each other. The lead wire L31 is routed through the hole A71a provided in the aluminum plate PL1 between the pair of cores MM11 and MM12 arranged with the first inter-core distance AW1 apart from the first face of the aluminum plate PL1 on which the cores MM11 and MM12 are provided to a second face (the face opposite to the face that is in contact with the cores MM11 and MM12) that is the face of the aluminum plate PL1 opposite to the first face on which the cores MM11 and MM12 are provided. The lead wire L31 routed from the backside of the aluminum plate PL1 is connected with the capacitor C11 in FIG. 1.

The lead wire L32 for connecting a coil end opposite to the coil end of the coil L12 that runs to the connecting portion A7 with the capacitor C12 in FIG. 1 is routed from inside diameter sides (the innermost portion of the loop of the coil L12) of the adjacent longer sides of the pair of coils L11 and L12, the longer sides being opposed to each other. The lead wire L32 is routed through the hole A72a provided in the aluminum plate PL1 between the pair of cores MM11 and MM12 arranged with the first inter-core distance AW1 apart from the first face of the aluminum plate PL1 on which the cores MM11 and MM12 are provided to a second face (the face opposite to the face that is in contact with the cores MM11 and MM12) that is the face of the aluminum plate PL1 opposite to the first face on which the cores MM11 and MM12 are provided. The lead wire L32 routed from the second face of the aluminum plate PL1 is connected with the capacitor C12 in FIG. 1.

4-2. Power Receiver Circuit According to Embodiment 2

Figure 16A:
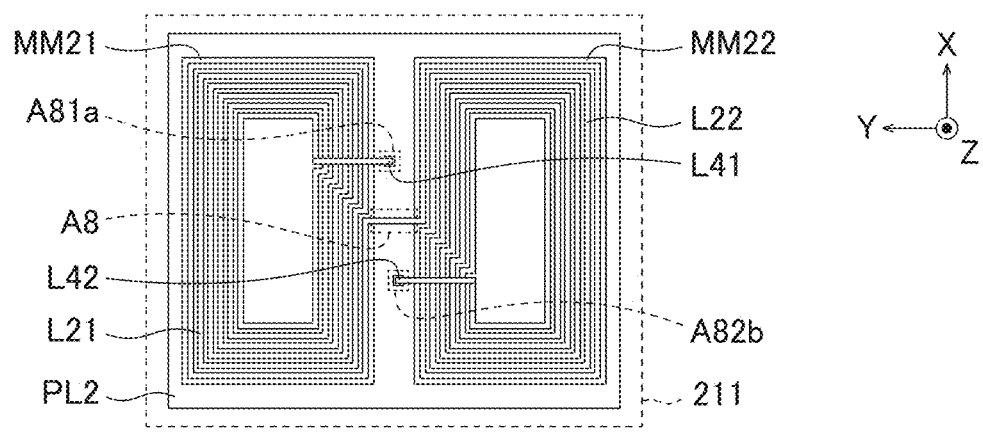
FIG. 16A is a plan view viewed from a vertical direction (Z-axis direction) for explaining a configuration of the power receiver circuit 210 according to embodiment 2 of the present disclosure.
Figure 16B:
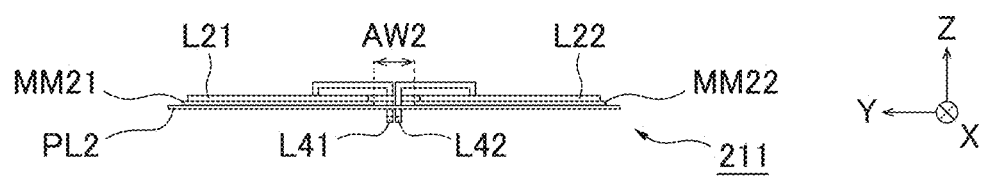
FIG. 16B is a side view viewed from a longitudinal direction (X-axis direction) on the horizontal plane for explaining a configuration of the power receiver circuit 210 according to embodiment 2 of the present disclosure.
Figure 16C:
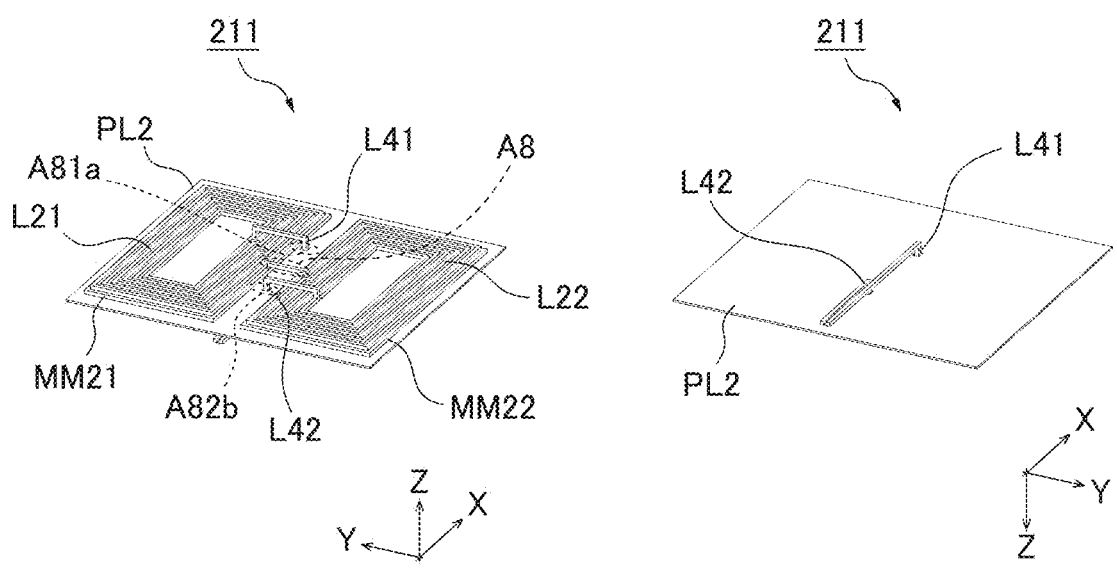
FIG. 16C is a perspective view for explaining a configuration of the power receiver circuit 210 according to embodiment 2 of the present disclosure.

FIGS. 16A, 16B and 16C is a conceptual diagram for explaining a configuration of the power receiver circuit 210 according to embodiment 2 of the present disclosure. With respect to the power receiver circuit 210 positioned on a horizontal plane (X-Y plane), FIG. 16A is a plan view viewed from a vertical direction (Z-axis direction), FIG. 16B is a side view viewed from a longitudinal direction (X-axis direction) on the horizontal plane, and FIG. 16C is a perspective view. The power receiver circuit 210 is a resonant circuit constructed from the power receiver coil 211 and the capacitors C21 and C22 as described earlier.

The power receiver coil 211 includes a second coil unit being a pair of coils (coils L21 and L22), a second core unit being a pair of cores (cores MM21 and MM22), and an aluminum plate PL2. The coils L21 and L22 and the cores MM21 and MM22 are held by a plastic component or the like (not illustrated).

Each of the coils L21 and L22 in the second coil unit has, as illustrated in FIGS. 16A, 16B and 16C, a circular shape formed by being wound in the horizontal plane (X-Y plane). The coils L21 and L22 are connected to each other at one end thereof by a connecting portion A8, and they are wound in such a way that the magnetic fields generated by currents are oriented oppositely to each other. In this way, the coils L21 and L22 in the second coil can respectively properly receive magnetic fields generated by the coils L11 and L12 in the first coil unit, which are oriented oppositely to each other.

The cores MM21 and MM22 in the second core unit are made of a magnetic material and respectively induce magnetic fields generated by the coils L21 and L22 in the second coil unit. The cores MM21 and MM22 are typically composed of ferrite.

The cores MM21 and MM22 in the second core unit are respectively integrated with the coils L21 and L22 in the second coil unit, and the cores are arranged side by side with the second inter-core distance AW2 apart in the horizontal direction (Y-axis direction).

Each of the coils L21 and L22 in the second coil unit has two longer sides (in FIGS. 16A, 16B and 16C, the sides of the coil along the X-axis direction, which is a major axis direction) and two shorter sides (in FIGS. 16A, 16B and 16C, the sides of the coil along the Y-axis direction, which is a minor axis direction). The coils L21 and L22 in the second coil unit are connected to each other by the connecting portion A8 at points in outside diameter portions of the opposing longer sides of the coils L21 and L22. In other words, the connecting portion A8 is provided on outside diameter sides of the adjacent longer sides of the pair of coils L21 and L22, the longer sides being opposed to each other (in an area between the coils L21 and L22).

The aluminum plate PL2 is a shield unit that is disposed under the coils L21 and L22 and the cores MM21 and MM22, and that reduces an effect of an external magnetic field on the power receiver circuit 210. The aluminum plate PL2 is disposed on a face of the two faces of the second core unit that is opposite to the face on which the second coil unit is provided. In other words, the second coil unit, the second core unit, and the aluminum plate PL2 are arranged in this order to be overlapped with each other. In addition, since the cores MM21 and MM22 are arranged side by side with the second inter-core distance AW2 apart in the horizontal direction (Y-axis direction), when the cores MM21 and MM22 are viewed from the vertical direction (Z-axis direction) in which the coils L21 and L22 are provided, the aluminum plate PL2 is exposed between the cores MM21 and MM22 and can be visually recognized. In this aluminum plate PL2 exposed between the cores MM21 and MM22, holes A81a and A82b are provided. It is preferred that the holes A81a and A82b in the aluminum plate PL2 are in a positional relationship in which these holes are substantially point-symmetric about a substantially central point of the connecting portion A8 as a point of symmetry.

To prevent increase in the physical size of the power receiver coil 211, lead wires L41 and L42 of the coils L21 and L22 in the second coil unit are respectively routed to a backside of the second core unit and the aluminum plate PL2 via the holes A81a and A82b. Providing the core slots in the second core unit for the lead wires of the coils to pass through causes imbalance in magnetoresistance of the coils L21 and L22, and the magnetic field generated by the lead wires cause saturation in the second core unit. To prevent this saturation, the second core unit is configured in such a way that the lead wires of the coils pass through the holes A81a and A82b provided in the aluminum plate between the pair of cores MM21 and MM22 arranged with the second inter-core distance AW2 apart. Further details will be described below.

The lead wire L41 for connecting a coil end opposite to the coil end of the coil L21 that runs to the connecting portion A8 with the capacitor C21 in FIG. 1 is routed from inside diameter sides (the innermost portion of the loop of the coil L21) of the adjacent longer sides of the pair of coils L21 and L22, the longer sides being opposed to each other. The lead wire L41 is routed through the hole A81a provided in the aluminum plate PL2 between the pair of cores MM21 and MM22 arranged with the second inter-core distance AW2 apart from the first face of the core MM21 on which the coil L21 is provided to a second face (the face opposite to the face that is in contact with the cores MM21 and MM22) that is the face of the aluminum plate PL2 opposite to the first face on which the cores MM21 and MM22 are provided. The lead wire L41 routed from the second face of the aluminum plate PL2 is connected with the capacitor C21 in FIG. 1.

The lead wire L42 for connecting a coil end opposite to the coil end of the coil L22 that runs to the connecting portion A8 with the capacitor C22 in FIG. 1 is routed from inside diameter sides (the innermost portion of the loop of the coil L22) of the adjacent longer sides of the pair of coils L21 and L22, the longer sides being opposed to each other. The lead wire L42 is routed through the hole A82b provided in the aluminum plate PL2 between the pair of cores MM21 and MM22 arranged with the second inter-core distance AW2 apart from the first face of the aluminum plate PL2 on which the cores MM21 and MM22 are provided to a second face (the face opposite to the face that is in contact with the cores MM21 and MM22) that is the face of the aluminum plate PL2 opposite to the first face on which the cores MM21 and MM22 are provided. The lead wire L42 routed from the backside of the aluminum plate PL2 is connected with the capacitor C22 in FIG. 1.

In embodiment 2 of the present disclosure, the first coil unit (coils L11 and L12) of the power transmitter coil 111 and the second coil unit (coils L21 and L22) of the power receiver coil 211 are also located to face each other. Therefore, as illustrated in FIGS. 15A, 15B and 15C and FIGS. 16A, 16B and 16C, when the first coil unit (coils L11 and L12) and the second coil unit (coils L21 and L22) of the power receiver coil 211 are located to face each other, the coil winding of the power receiver coil 211 from the coil L21 to the coil L22 via the connecting portion A8 is configured to be similarly routed to that of the power transmitter coil 111 from the coil L11 to the coil L12 via the connecting portion A7. Similarly, as illustrated in FIGS. 15A, 15B and 15C and FIGS. 16A, 16B and 16C, when the first coil unit (coils L11 and L12) and the second coil unit (coils L21 and L22) of the power receiver coil 211 are located to face each other, lead wires of the power receiver coil 211 that run from the second coil unit (coils L21 and L22) to the capacitor C21 and the capacitor C22 are configured to be similarly routed to those of the power transmitter coil 111 that run from the first coil unit (coils L11 and L12) to the capacitor C11 and the capacitor C12. In this way, increase in intensity of the distant leakage magnetic field in the X direction and intensity of the distant leakage magnetic field in the Y direction can be successfully reduced even further.

In addition, the length of the first coil unit in the major axis direction (in FIGS. 15A, 15B and 15C, the X-axis direction) is configured to be longer than the length of the second coil unit in the major axis direction (in FIGS. 16A, 16B and 16C, the X-axis direction). In contrast, the lengths of the first coil unit and the second coil unit in the minor axis direction (in FIGS. 15A, 15B and 15C and FIGS. 16A, 16B and 16C, the Y-axis direction) are configured to be equal. In this way, pulsation of the power received by the power receiver coil 211 can be reduced.

5. Characteristics of the Wireless Power Transfer System 10 According to Embodiment 2

FIG. 17A is a diagram illustrating the distribution of a magnetic flux density inside a core of the power transmitter coil 111 according to embodiment 2 of the present disclosure when power of 30 kW is transmitted. FIG. 17B is a diagram illustrating legend of magnetic flux density for FIG. 17A. As illustrated in FIGS. 17A and 17B, in the power transmitter coil 111 according to embodiment 2 of the present disclosure, there are no core slot and no hole provided in the cores M11 and M12, saturation of the magnetic fields for the cores M11 and M12 is prevented.

Figures 18A, 18B:
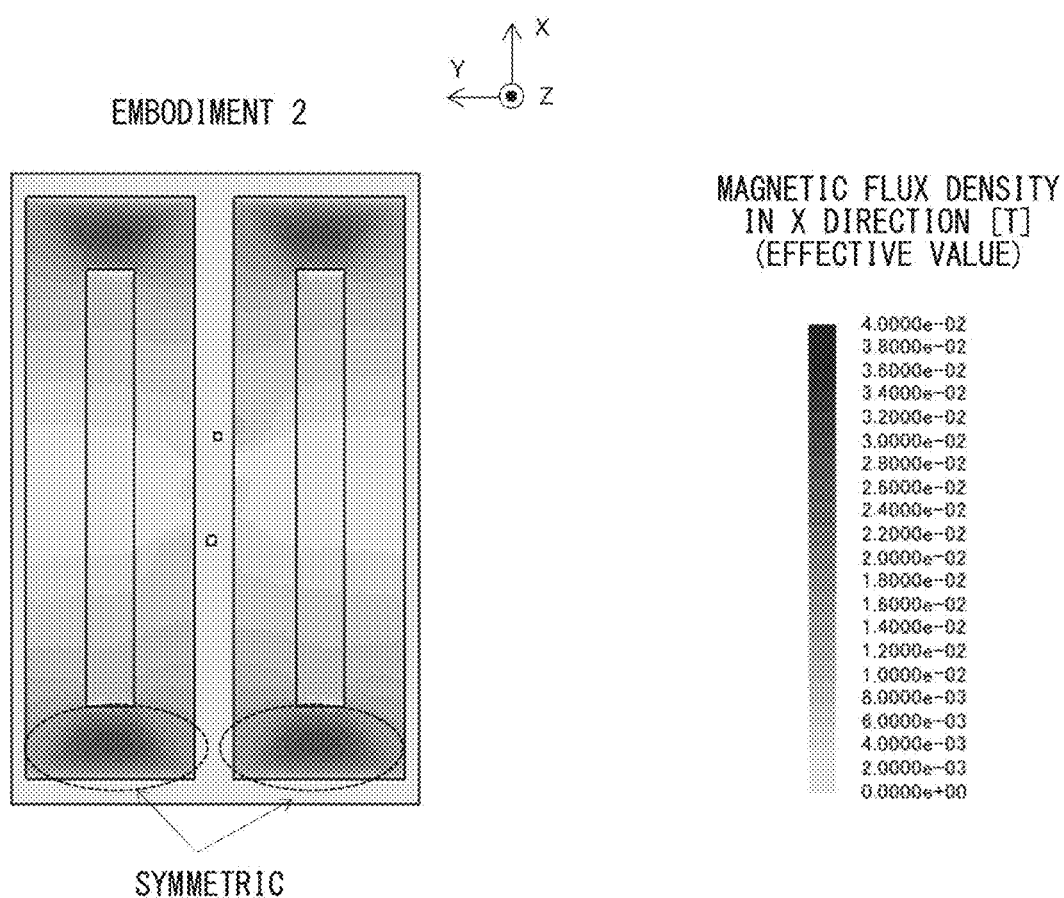
FIG. 18A is a diagram illustrating the distribution of a magnetic flux density in the X direction (the direction of travel of a vehicle) inside a core of the power transmitter coil 111 according to embodiment 2 of the present disclosure when power of 30 kW is transmitted.
FIG. 18B is a diagram illustrating legend of magnetic flux density in the X direction (the direction of travel of a vehicle) for FIG. 18A.

FIG. 18A is a diagram illustrating the distribution of a magnetic flux density in the X direction (the direction of travel of a vehicle) inside a core of the power transmitter coil 111 according to embodiment 2 of the present disclosure when power of 30 kW is transmitted. FIG. 18B is a diagram illustrating a legend of magnetic flux density in the X direction (the direction of travel of a vehicle) for FIG. 18A. As illustrated in FIGS. 18A and 18B, in the power transmitter coil 111 according to embodiment 2 of the present disclosure, the magnetic fields in the X direction generated by the pair of coils L11 and L12 are approximately equal in intensity, the asymmetric property is reduced, and saturation is prevented.

Figure 19:
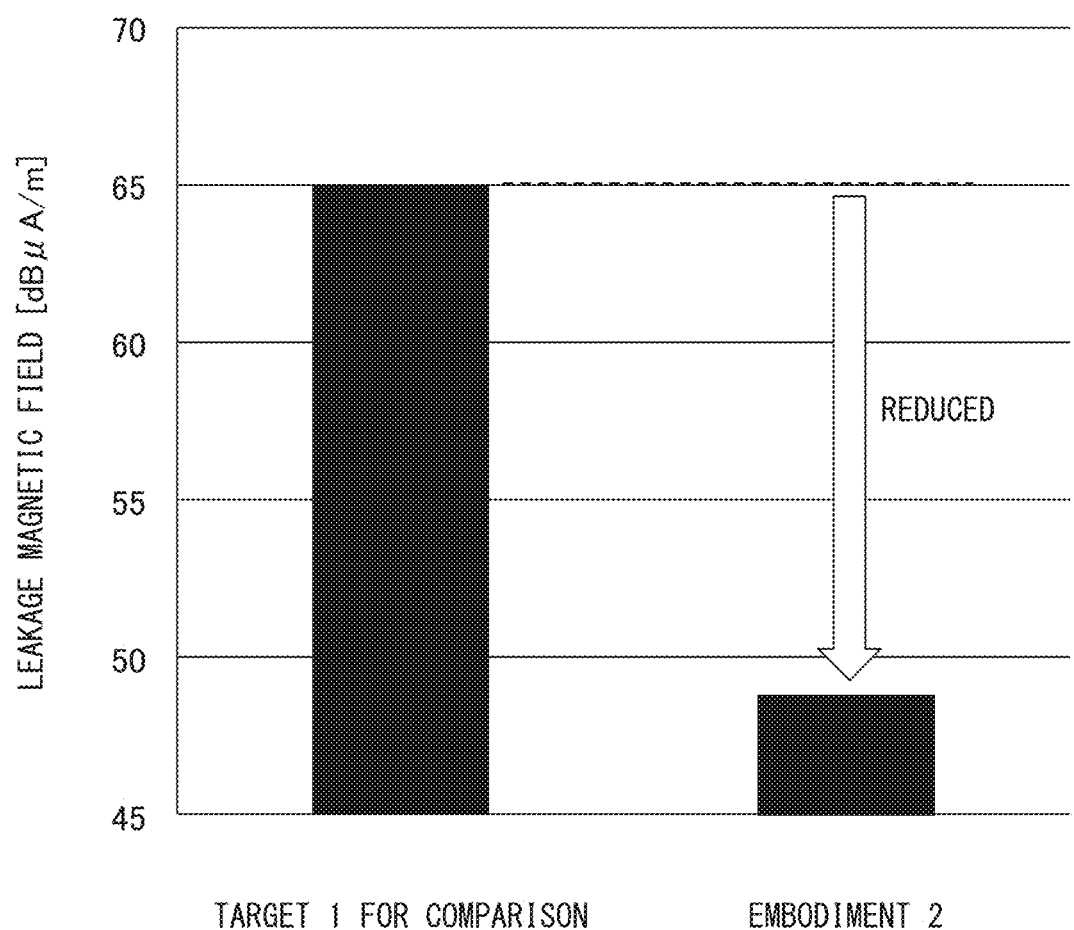
FIG. 19 is a diagram illustrating a comparison result of distant leakage magnetic fields in the X direction at a 10 m point depicted in FIG. 10 in the wireless power transfer system of target 1 for comparison (FIGS. 7A, 7B and 7C and FIGS. 8A, 8B and 8C) and the wireless power transfer system 10 according to embodiment 2 of the present disclosure (FIG. 1, FIG. 4, FIGS. 5A, 5B and 5C, FIGS. 15A, 15B and 15C, and FIGS. 16A, 16B and 16C).

FIG. 19 is a diagram illustrating a comparison result of distant leakage magnetic fields in the X direction at a 10 m point depicted in FIG. 10 in the wireless power transfer system of target 1 for comparison (FIGS. 7A, 7B and 7C and FIGS. 8A, 8B and 8C) and the wireless power transfer system 10 according to embodiment 2 of the present disclosure (FIG. 1, FIG. 4, FIGS. 5A, 5B and 5C, FIGS. 15A, 15B and 15C, and FIGS. 16A, 16B and 16C). It is found that, as illustrated in FIG. 19, the wireless power transfer system 10 according to embodiment 2 of the present disclosure (FIG. 1, FIG. 4, FIGS. 5A, 5B and 5C, FIGS. 15A, 15B and 15C, and FIGS. 16A, 16B and 16C) reduces the distant leakage magnetic field by about 16 dB compared to the wireless power transfer system of target 1 for comparison (FIGS. 7A, 7B and 7C and FIGS. 8A, 8B and 8C).

The inventors of the present application have found that, by configuring the pair of coils included in each of the power transmitter coil and the power receiver coil to have a circular shape formed by being wound in the horizontal plane, and providing each core of the pair of cores arranged spaced apart from each other with a core slot that divides the core at a position where the core slot configures the core to be substantially axisymmetric about a centerline that is at the same distance from each coil of the pair of coils as an axis of symmetry, increase in physical sizes of the power transmitter coil and the power receiver coil is prevented, and at the same time, imbalance in magnetic fields generated by the coils of the pair of coils is prevented, and a leakage magnetic field can be successfully reduced. In addition, the inventors have found that, by configuring the lead wire from the coil disposed on the first face of the core is routed to pass through the core slot to the second face, the second face being a face of the core opposite to the first face, imbalance in magnetic fields generated by the coils of the pair of coils is prevented, and the leakage magnetic field can be successfully reduced.

According to the present disclosure, a wireless power transfer system may be achieved in which increase in the physical sizes of the power transmitter coil and the power receiver coil is prevented and the leakage magnetic field can be successfully reduced at the same time.

All embodiments disclosed in the present disclosure are exemplary in all respects and shall not be considered to be limiting. The scope of the present disclosure is defined not by the description above but by the claims, and it is intended that any changes within the scope of the claims and equivalents thereof are included.

The invention claimed is:

1. A wireless power transfer system that wirelessly transfers power from a power transmitter coil to a power receiver coil,
   wherein the power transmitter coil and the power receiver coil each include a coil unit, the coil unit being a pair of coils arranged side by side in a horizontal direction, and a core unit, the core unit being a pair of cores each configured to induce a magnetic field generated by each of the coils in the coil unit,
   wherein each of the coils in the coil unit has a shape formed by being wound in a horizontal plane and the coils are configured in such a way that magnetic fields generated by currents are oriented oppositely to each other,
   wherein each of the cores in the core unit is integrated with each coil in the coil unit and the cores are arranged spaced apart from each other, and
   wherein each of the cores in the core unit is provided with a core slot that divides the core at a position where the core slot configures the core to be substantially axisymmetric about a centerline that is at the same distance from each of the coils of the pair of coils as an axis of symmetry.

2. The wireless power transfer system according to claim 1, wherein a lead wire from the coil disposed on a first face of each of the cores is routed to pass through the core slot to a second face, the second face being a face of the core opposite to the first face.

3. A wireless power transfer system that wirelessly transfers power from a power transmitter coil to a power receiver coil,
   wherein the power transmitter coil and the power receiver coil each include: a coil unit, the coil unit being a pair of coils arranged side by side in a horizontal direction; a core unit, the core unit being a pair of cores each configured to induce a magnetic field generated by each of the coils in the coil unit; and a shield unit disposed on a face of the core unit that is opposite to the face on which the coil unit is provided,
   wherein each of the coils in the coil unit is formed by being wound in a horizontal plane and the coils are configured in such a way that directions of magnetic fields generated by currents flowing through the coils are oriented oppositely to each other,
   wherein each of the cores in the core unit is integrated with each coil in the coil unit and the cores are arranged spaced apart from each other, and
   wherein a lead wire from one of the coils is routed to pass through a hole provided in a portion of the shield unit exposed between the pair of cores arranged spaced apart to a second face, the second face being a face of the shield unit opposite to a first face on which the core is provided.

* * * * *